United States Patent
Takikawa et al.

(10) Patent No.: US 8,837,011 B2
(45) Date of Patent: Sep. 16, 2014

(54) IMAGE PROCESSING APPARATUS, IMAGE PROCESSING METHOD AND PROGRAM

(75) Inventors: Yoichi Takikawa, Kawasaki (JP); Hideki Kubo, Kawasaki (JP); Takashi Ochiai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/878,010

(22) PCT Filed: Oct. 27, 2011

(86) PCT No.: PCT/JP2011/075363
§ 371 (c)(1),
(2), (4) Date: Apr. 5, 2013

(87) PCT Pub. No.: WO2012/060432
PCT Pub. Date: May 10, 2012

(65) Prior Publication Data
US 2013/0229696 A1    Sep. 5, 2013

(30) Foreign Application Priority Data

Nov. 2, 2010  (JP) ................................. 2010-246744
Nov. 4, 2010  (JP) ................................. 2010-247836
Nov. 4, 2010  (JP) ................................. 2010-247839

(51) Int. Cl.
| | | |
|---|---|---|
| H04N 1/04 | (2006.01) |
| B41J 2/455 | (2006.01) |
| B41J 2/47 | (2006.01) |
| G03G 15/00 | (2006.01) |
| G02B 26/08 | (2006.01) |
| A61B 8/14 | (2006.01) |
| G03G 15/043 | (2006.01) |
| G06K 15/12 | (2006.01) |
| H04N 1/40 | (2006.01) |

(52) U.S. Cl.
CPC ......... H04N 1/40093 (2013.01); G03G 15/043 (2013.01); G06K 15/1219 (2013.01); G06K 15/1209 (2013.01)
USPC ........... 358/474; 358/481; 347/235; 347/233; 347/234; 399/15; 399/49; 359/204.2; 600/459

(58) Field of Classification Search
USPC .................. 358/474, 481; 347/235, 233, 234; 399/15, 49; 359/204.2; 600/459
See application file for complete search history.

(56) References Cited

U.S. PATENT DOCUMENTS 5,844,591 A * 12/1998 Takamatsu et al. ........... 347/235
5,900,901 A    5/1999 Costanza et al.
(Continued)

FOREIGN PATENT DOCUMENTS

EP   0747746 A2   12/1996
JP   2-131956 A    5/1990
(Continued)

OTHER PUBLICATIONS

International Search Report an Written Opinion mailed Feb. 7, 2012, in International Application No. PCT/JP2011/075363.

Primary Examiner — Charlotte M Baker
Assistant Examiner — Rury Grisham
(74) Attorney, Agent, or Firm — Fitzpatrick, Cella, Harper & Scinto

(57) ABSTRACT

There is provided an image forming apparatus comprising: detection means for detecting position information indicating a scanning position; interval prediction means for predicting a first scanning line interval indicating a distance in the sub-scanning direction between the scanning line of interest and a succeeding scanning line to be scanned after the scanning line of interest; interval calculation means for calculating, by using the position information held by the holding means, a second scanning line interval indicating a distance in the sub-scanning direction between the scanning line of interest and the scanned scanning line; and rate calculation means for calculating a correction rate on an exposure amount for the scanning line of interest so that a predicted density calculated using the first scanning line interval and the second scanning line interval matches with a predicted density calculated using a predetermined reference scanning line interval.

22 Claims, 28 Drawing Sheets

(56) References Cited

U.S. PATENT DOCUMENTS

| | | |
|---|---|---|
| 7,075,563 B2 | 7/2006 | Itabashi |
| 7,463,279 B2 | 12/2008 | Koga et al. |
| 7,835,040 B2* | 11/2010 | Seki ............................. 358/481 |
| 8,241,218 B2* | 8/2012 | Hirama ........................ 600/459 |
| 2003/0025782 A1* | 2/2003 | Amada et al. ................ 347/233 |
| 2003/0179428 A1* | 9/2003 | Suzuki et al. ................ 359/204 |
| 2004/0032483 A1 | 2/2004 | Itabashi |
| 2006/0202116 A1 | 9/2006 | Koga et al. |
| 2007/0046768 A1* | 3/2007 | Neary et al. ................. 347/234 |
| 2011/0076040 A1* | 3/2011 | Uchidate et al. ............. 399/49 |
| 2011/0243582 A1* | 10/2011 | Matsumoto et al. ......... 399/15 |

FOREIGN PATENT DOCUMENTS

| | | |
|---|---|---|
| JP | 5-2317 A | 1/1993 |
| JP | 8-332748 A | 12/1996 |
| JP | 2004-12568 A | 1/2004 |
| JP | 2005-7697 A | 1/2005 |
| JP | 2006-159647 A | 6/2006 |
| JP | 2008-26541 A | 2/2008 |

* cited by examiner

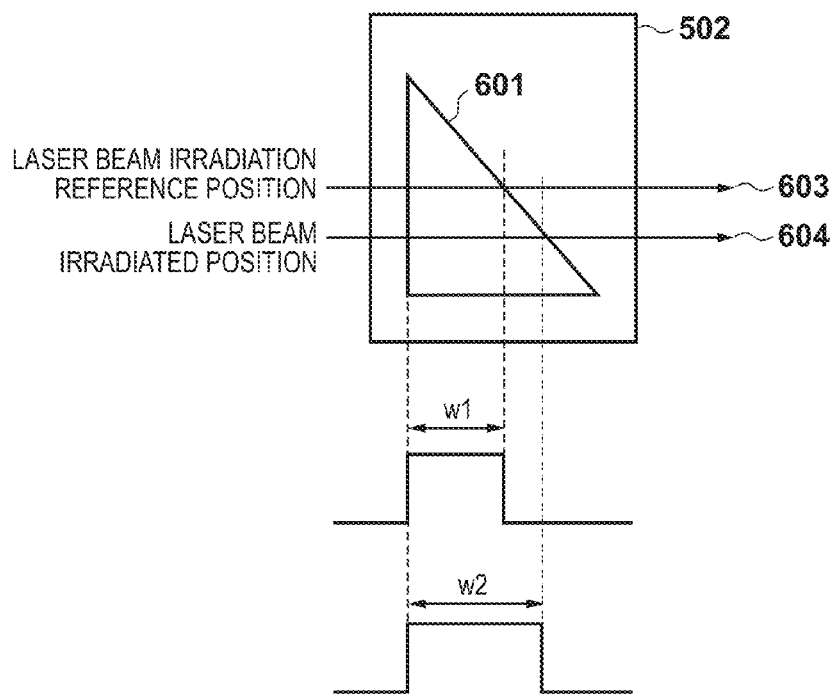

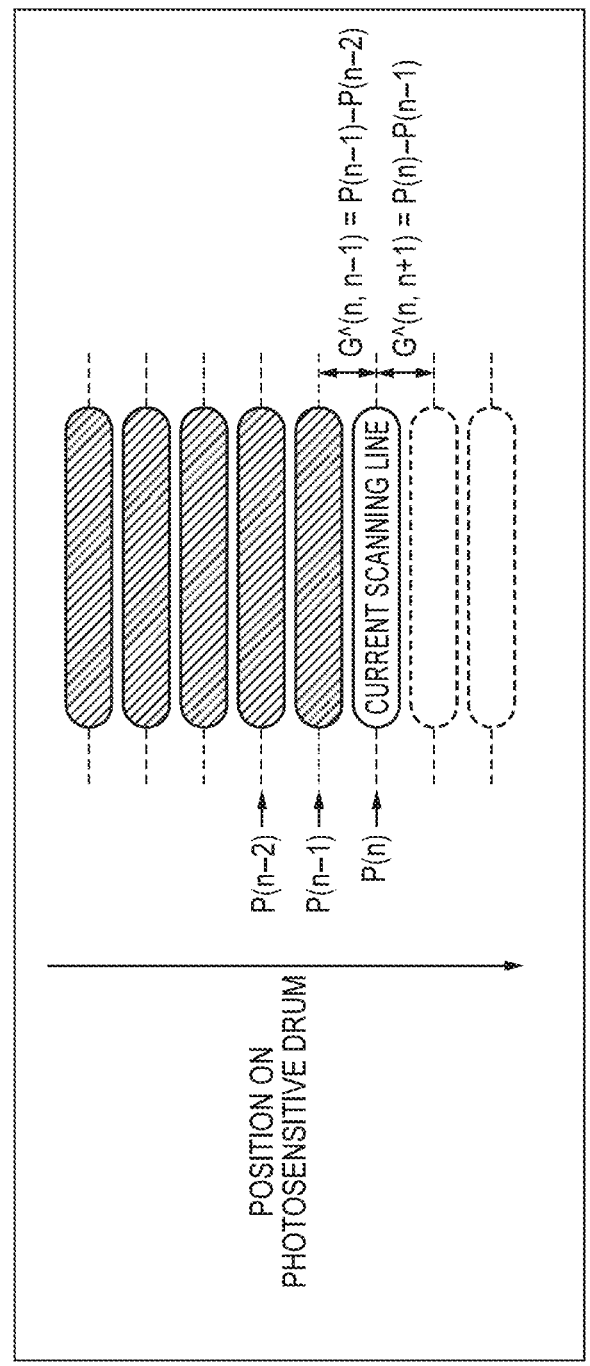

ABSENCE OF SCANNING LINE POSITION ERROR
sh: DOT SHAPE
901
902
POSITION OF INTEREST

PRESENCE OF SCANNING LINE POSITION ERROR
901
903
904
POSITION OF INTEREST

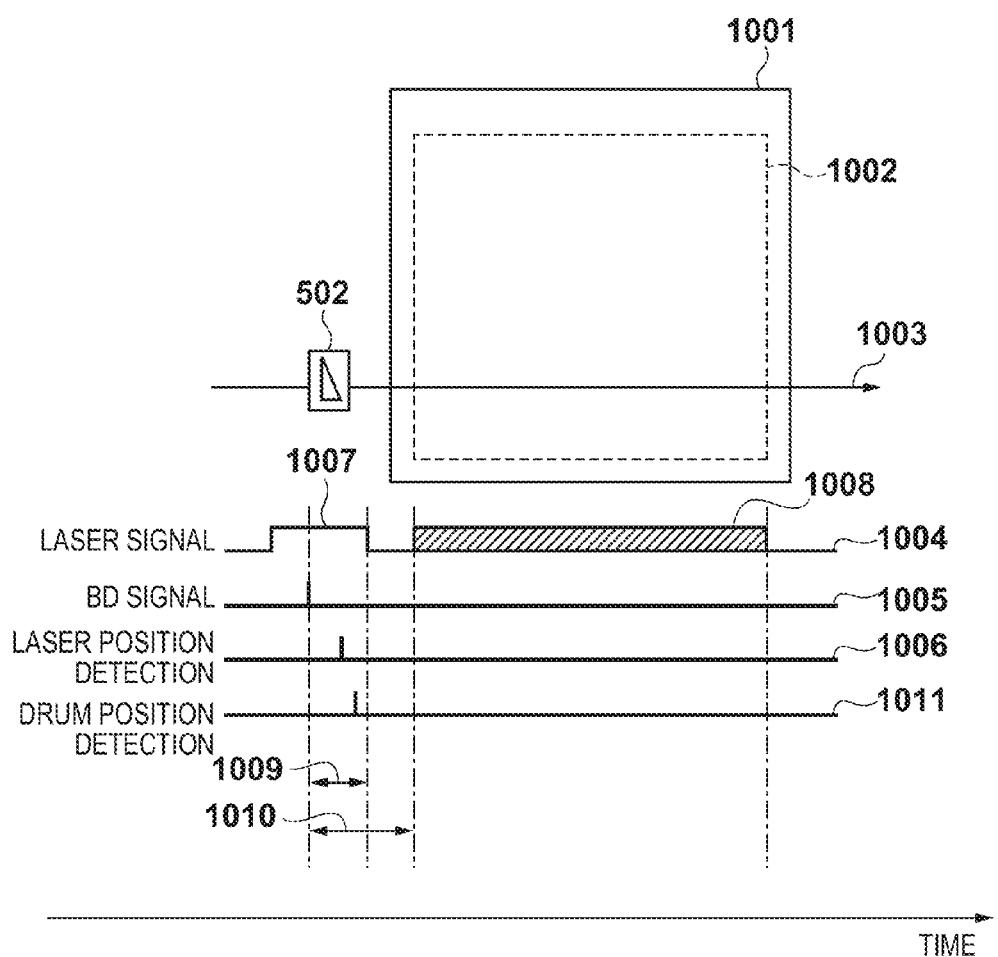

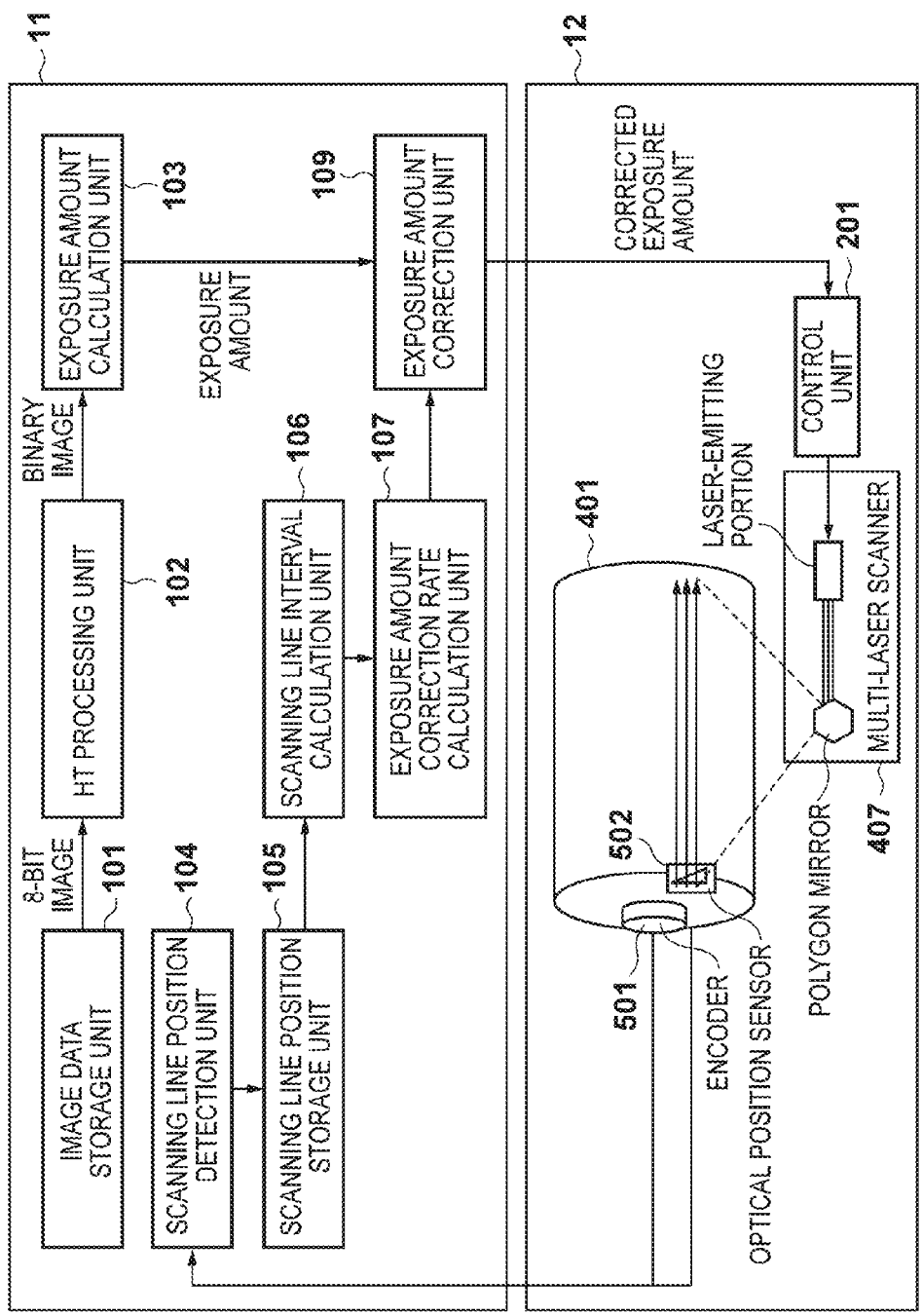

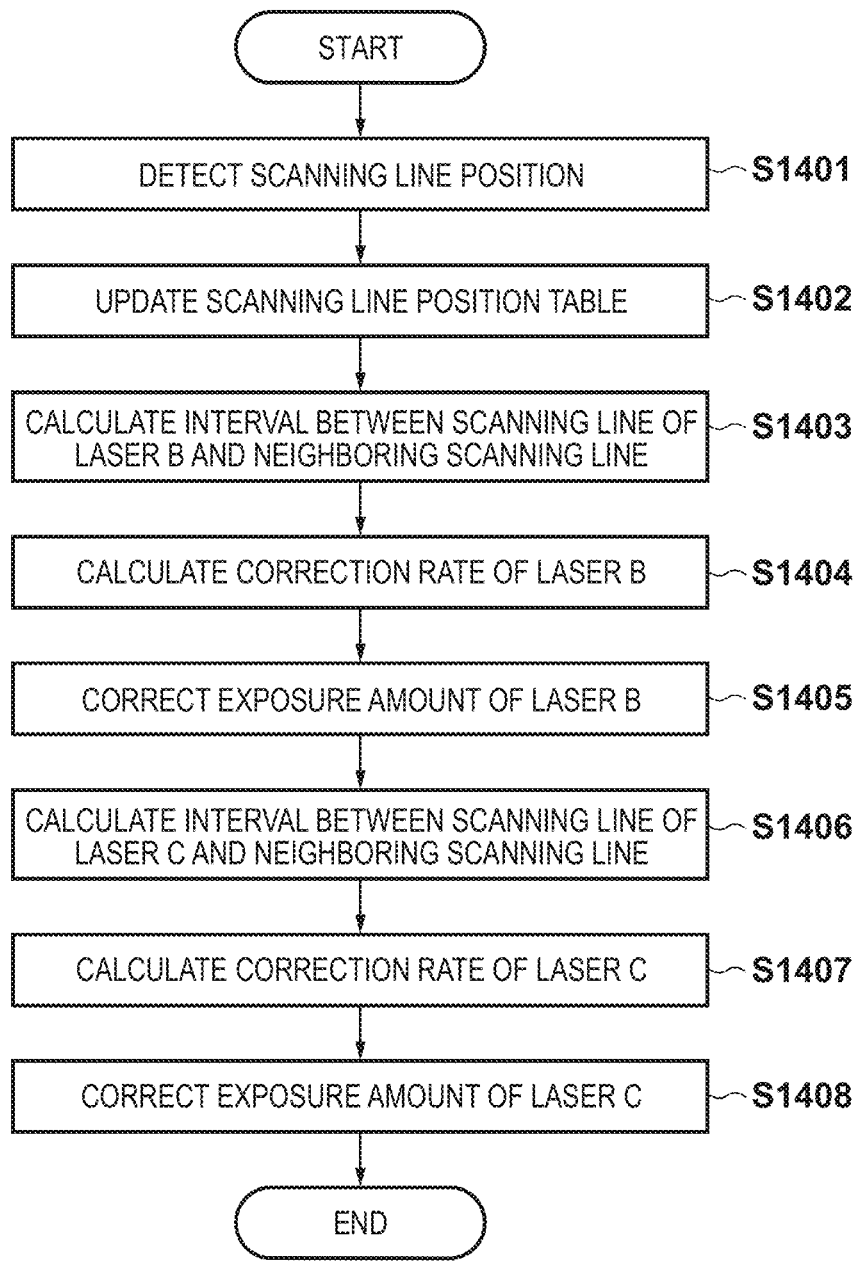

FIG. 13A

| SCANNING LINE NUMBER | n | n-2 | n-3 | n-4 | n-5 |
|---|---|---|---|---|---|
| POSITION | P(n) | P(n-2) | P(n-3) | P(n-4) | P(n-5) |

FIG. 13B

| SCANNING LINE NUMBER | n | n-2 | n-3 | n-4 | n-5 |
|---|---|---|---|---|---|
| POSITION | 0 | 2X | 3X | 4X | 5X |

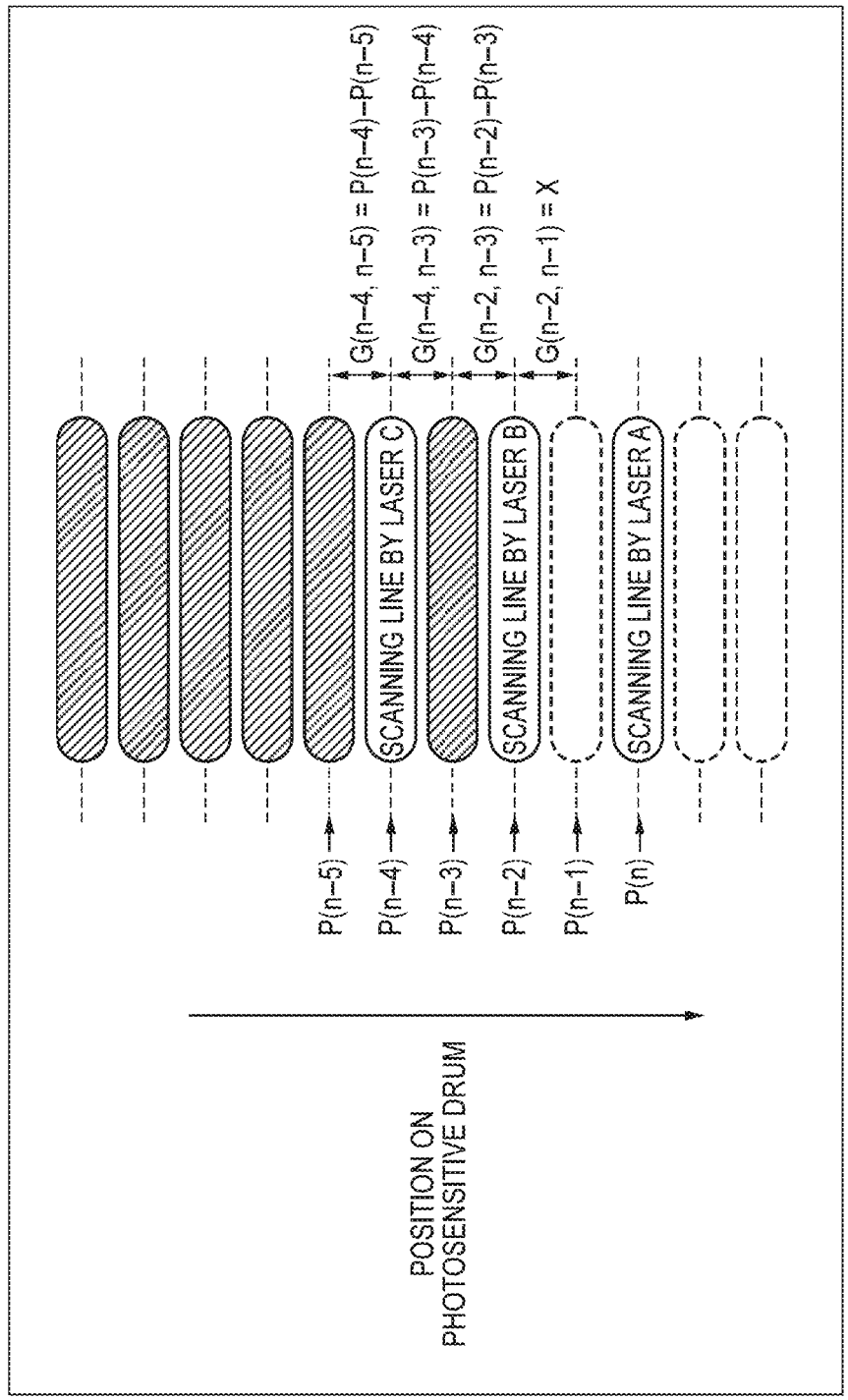

F I G. 18
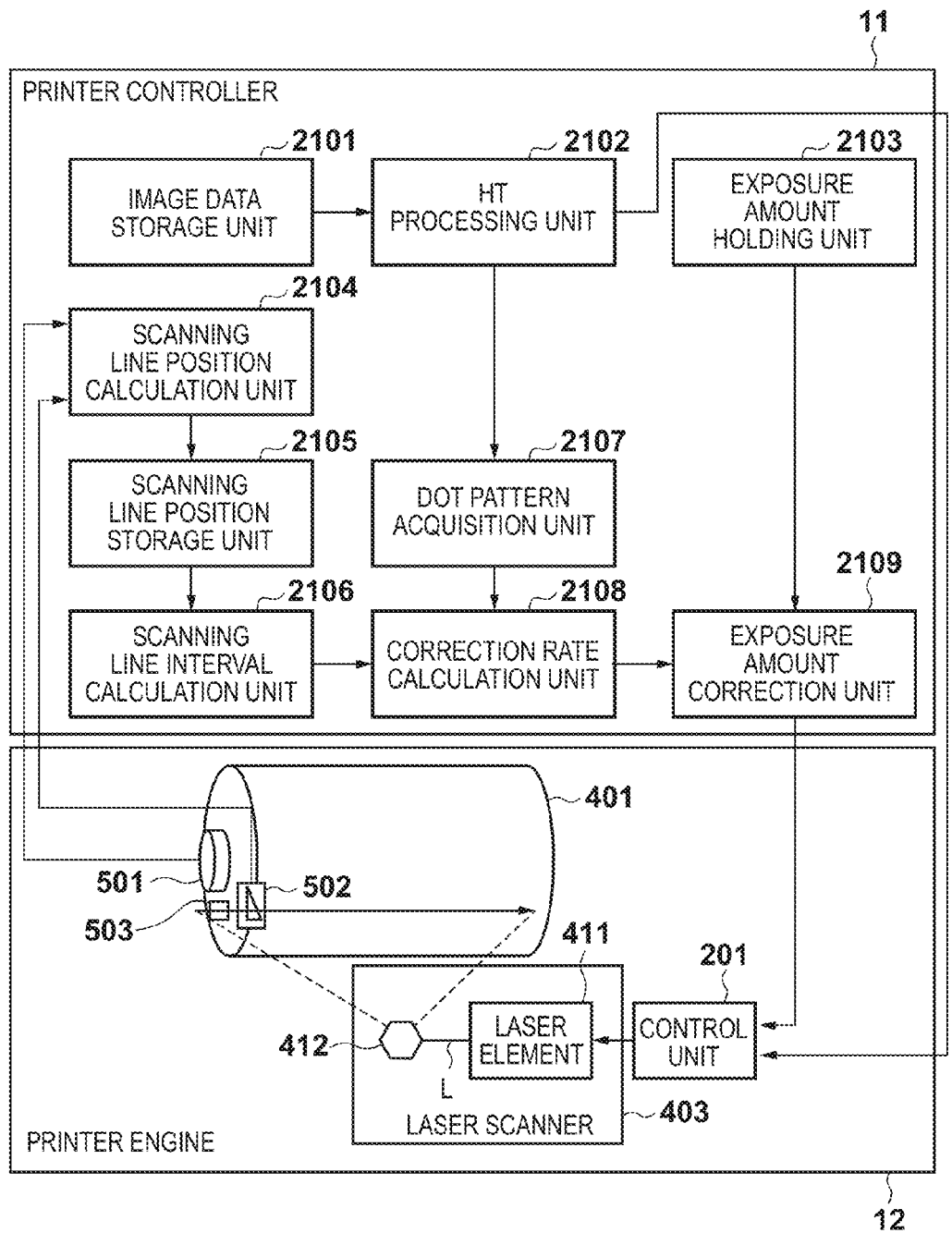

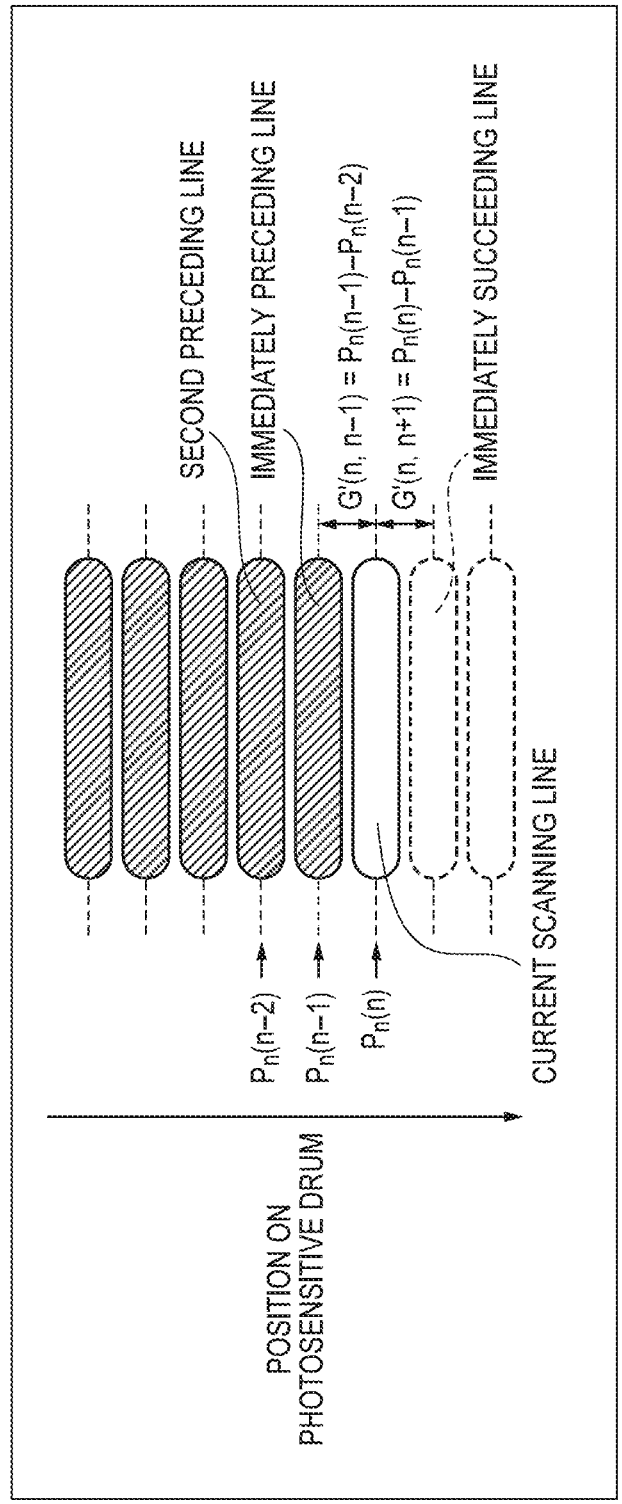

F I G. 20A
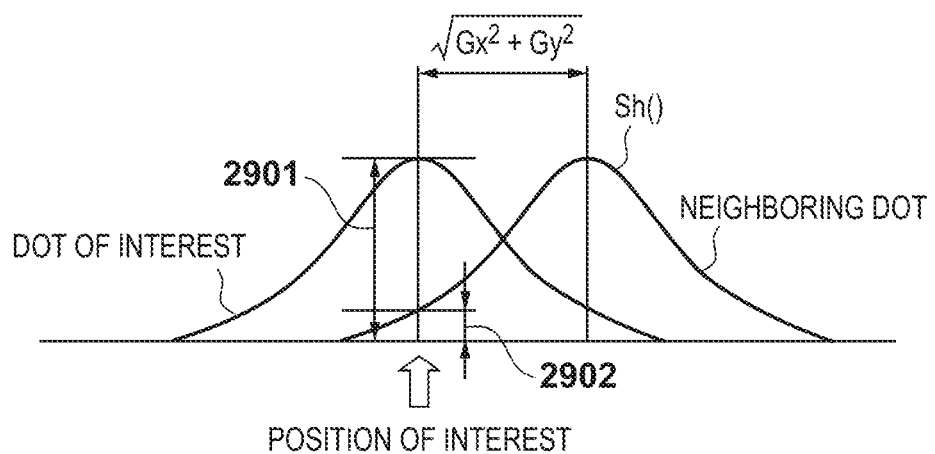
F I G. 20B
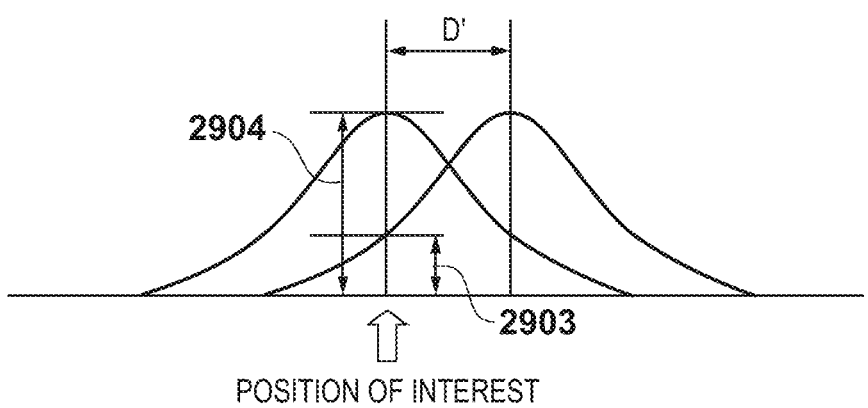

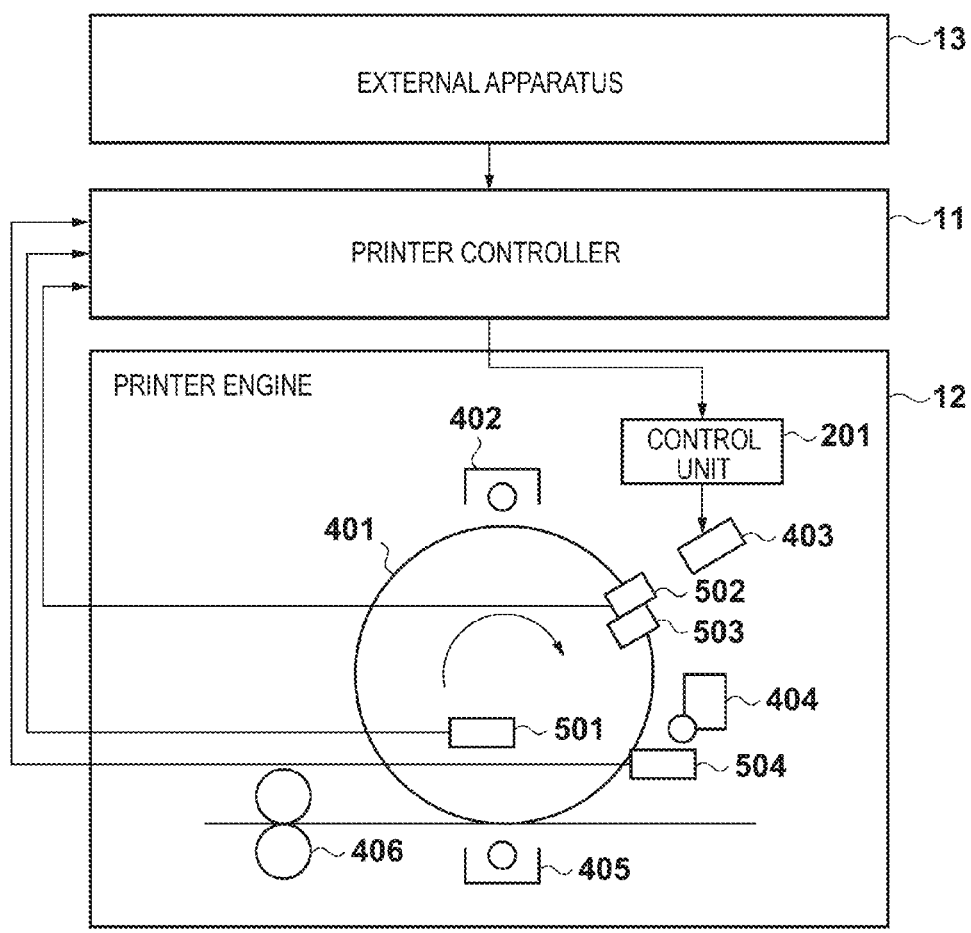

| SCANNING LINE NUMBER | n | n-1 | n-2 | ... | n-m |
|---|---|---|---|---|---|
| ERROR | Px(n) | Px(n-1) | Px(n-2) | ... | Px(n-m) |

| SCANNING LINE NUMBER | n | n-1 | n-2 | ... | n-m |
|---|---|---|---|---|---|
| ERROR | 0 | 0 | 0 | ... | 0 |

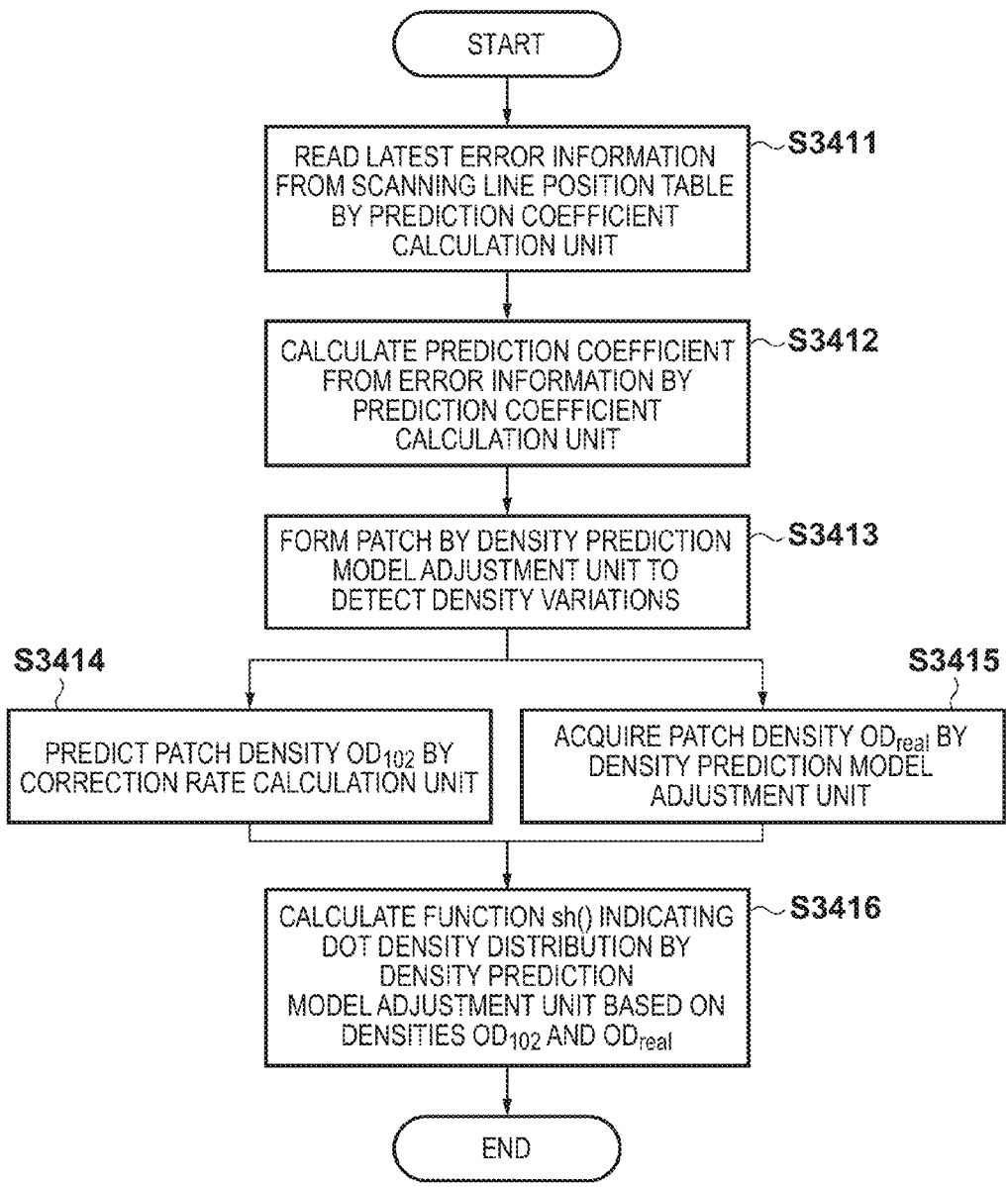

IMAGE PROCESSING APPARATUS, IMAGE PROCESSING METHOD AND PROGRAM

TECHNICAL FIELD

The present invention relates to an image processing apparatus which forms an electrostatic latent image on an image carrier by exposing and scanning the image carrier, and a control method thereof.

BACKGROUND ART

Generally, an electrophotographic image forming apparatus forms an image by exposing a photosensitive body (image carrier) such as a photosensitive drum or photosensitive belt with a laser beam or the like to form an electrostatic latent image corresponding to an image signal, developing the electrostatic latent image, and transferring it onto a printing medium or the like. At this time, the laser beam is scanned sequentially one-dimensionally in the main scanning direction, for example, from left to right. At the same time, the laser beam is scanned in a direction almost perpendicular to the main scanning direction, for example, from top to bottom. On the image carrier, many straight lines (to be referred to as scanning lines) in the main scanning direction are formed parallelly at a predetermined interval (to be referred to as a reference scanning line interval) in the sub-scanning direction.

An image formed by an image forming apparatus of this type generates a horizontal stripe (to be referred to as banding) upon variations of the image density owing to various causes, greatly degrading the image quality.

For example, an image carrier speed error causes a scanning line interval error, generating banding. More specifically, even if the entire photosensitive body is to be exposed uniformly, when its rotational speed is high, the exposure amount decreases because the scanning line interval widens, and when the rotational speed is low, increases because the scanning line interval narrows. As a result, the density of the formed image varies.

A laser beam irradiation intensity error also generates banding. More specifically, even if the entire photosensitive body is to be uniformly exposed, the exposure amount decreases when the laser beam irradiation intensity is low, and increases when it is high. The density of the formed image varies as well.

As a method for correcting banding, there is proposed a method of detecting a scanning line position error caused by an image carrier speed error, calculating the interval from an immediately preceding scanning line based on the position error, and adjusting the exposure amount based on the interval (see, for example, Japanese Patent Laid-Open No. 2-131956).

In general, the image density of a formed image is affected by the density of neighboring scanning lines. Hence, banding correction by adjustment of the exposure amount requires position information of neighboring scanning lines in addition to the current scanning line. However, in the method disclosed in Japanese Patent Laid-Open No. 2-131956, scanning line interval information used in correction is only information of the interval between the current scanning line and the immediately preceding scanning line. Also, the correction rate or the like is not particularly calculated, and no satisfactory correction may be done.

Japanese Patent Laid-Open No. 5-002317 discloses an invention which reduces banding by detecting an image carrier speed error and correcting the exposure intensity of a laser beam to keep constant the exposure amount of the image carrier per unit area.

As a matter of course, the local density of an image is affected by dots which form the image. For example, when printing a so-called solid image by forming dots on the entire image surface, if the image carrier speed is lower than the reference, dots become dense and the image density increases, and if it is higher, the image density decreases. Controlling the exposure amount by the invention of Japanese Patent Laid-Open No. 5-002317 can prevent a change of the image density caused by an image carrier speed error, forming an image at an almost uniform density. However, a discrete dot or so-called isolated point is not affected by neighboring dots. To adjust the density of the isolated point to a desired value, the dot needs to be formed at the same exposure intensity regardless of the image carrier speed.

The concept of density correction will be explained with reference to the schematic view of FIG. 16. In FIG. 16, a shows a state in which the reference line interval is maintained and the dot interval is constant. In this case, the exposure intensity suffices to be constant between scanning lines. In FIG. 16, b shows a state in which the scanning line interval widens between lines N and N+2 and narrows between lines N+3 and N+5. In this case, the exposure intensity of line N+1 is increased and that of line N+4 is decreased. Accordingly, a change of the image density by an image carrier speed error can be prevented, forming an image at an almost uniform density.

However, color dots are not always formed on all lines aligned in the sub-scanning direction except for a solid image. In FIG. 16, c shows an example of forming white dots indicated by broken lines on lines N, N+2, N+3, and N+5, and forming color dots on lines N+1 and N+4. In this case, to form color dots (isolated points) on lines N+1 and N+4 at a desired density, the exposure intensity should not be changed even if the scanning line interval varies as in b of FIG. 16. That is, to form a given point of an image at a desired density, the exposure intensity needs be controlled in accordance with the image carrier speed error, and at the same time, a dot pattern around the point needs to be considered.

Japanese Patent Laid-Open No. 2-131956 discloses an invention in which a scanning line position error by an image carrier speed error is detected, the interval from an immediately preceding scanning line is calculated from the detected error, and the exposure amount is adjusted based on the calculated interval.

The density of a formed image is affected by the density of scanning lines. Thus, banding correction by adjustment of the exposure amount requires information of neighboring scanning lines in addition to that of the current scanning line. However, in the invention of Japanese Patent Laid-Open No. 2-131956, scanning line interval information used in correction is only information indicating the interval between the current scanning line and the immediately preceding scanning line. Banding cannot be corrected sufficiently.

If the position of a scanning line succeeding the current scanning line is predicted, information of neighboring scanning lines in addition to the current scanning line can be obtained, and the exposure amount can be adjusted using the information. However, if the predicted position of a scanning line or the exposure amount to be adjusted has an error, no banding can be corrected appropriately.

SUMMARY OF INVENTION

One aspect of the present invention provides a technique of performing high-precision banding correction by calculating the correction rate of the exposure amount for a scanning line of interest based on position information of the scanning line of interest and preceding and succeeding scanning lines.

Another aspect of the present invention provides a technique of suppressing density variations depending on the dot density to reduce banding, and suppressing a decrease in the density of an isolated point upon suppressing density variations for banding.

Still another aspect of the present invention provides a technique of suppressing density variations depending on the scanning line density to reduce banding.

According to one aspect of the invention, an image processing apparatus which forms an electrostatic latent image on an image carrier by scanning and exposing the image carrier in a main scanning direction using exposure means, which image carrier moves in a sub-scanning direction perpendicular to the main-scanning direction, comprises: detection means for detecting position information indicating a scanning position in the sub-scanning direction on the image carrier; holding means for holding, based on a detection result of the detection means, the position information about a scanning line of interest to be scanned, and the position information about an scanned scanning line which has already been scanned; interval prediction means for predicting, by using the position information held by the holding means, a first scanning line interval indicating a distance in the sub-scanning direction between the scanning line of interest and a succeeding scanning line to be scanned after the scanning line of interest; interval calculation means for calculating, by using the position information held by the holding means, a second scanning line interval indicating a distance in the sub-scanning direction between the scanning line of interest and the scanned scanning line; rate calculation means for calculating a correction rate on an exposure amount for the scanning line of interest so that a predicted density calculated using the first scanning line interval and the second scanning line interval matches with a predicted density calculated using a predetermined reference scanning line interval; and correction means for correcting the exposure amount for the scanning line of interest by multiplying the exposure amount by the correction rate, wherein the exposure means scans and exposes the scanning line of interest by the exposure amount corrected by the correction means.

According to another aspect of the invention, an image processing apparatus which forms a plurality of scanning lines at an interval of a predetermined number of scanning lines by one scanning on an image carrier moving in a sub-scanning direction, which scanning is performed by the exposure means scanning and exposing in a main scanning direction perpendicular to the sub-scanning direction, comprises: detection means for detecting position information indicating a scanning position of each of the plurality of scanning lines in the sub-scanning direction on the image carrier; holding means for holding, based on a detection result of the detection means, position information about a plurality of scanning lines to be formed by scanning of interest, and position information about scanned scanning lines which have been already scanned before the scanning of interest; calculation means for calculating, for a scanning line of interest which is sandwiched between the scanned scanning lines, which scanning line of interest is selected from the plurality of scanning lines to be formed in the scanning of interest, a first scanning line interval and second scanning line interval indicating distances in the sub-scanning direction between the scanning line of interest and scanning lines which sandwich the scanning line of interest, by using position information held by the holding means; rate calculation means for calculating a correction rate on an exposure amount of the scanning line of interest so that a predicted density calculated using the first scanning line interval and the second scanning line interval matches with a predicted density calculated using a predetermined reference scanning line interval; and correction means for correcting an exposure amount for the scanning line of interest by multiplying the exposure amount by the correction rate, wherein in the scanning of interest, the exposure means scans and exposes the scanning line of interest by the exposure amount corrected by the correction means, and other scanning lines by a preset exposure amount.

According to still another aspect of the invention, an image processing apparatus comprises: error calculation means for calculating an error of a scanning line position on an image carrier in a sub-scanning direction, for a current line; update means for updating, by using the calculated error, information indicating scanning line positions of a current line and a line preceding the current line; distance calculation means for calculating a distance between a dot of interest on the current line and a dot near the dot of interest by using the updated information indicating scanning line positions; acquisition means for acquiring a dot pattern around the dot of interest; and control means for controlling an exposure amount of the dot of interest based on the calculated distance and the dot pattern.

According to yet another aspect of the invention, an image processing apparatus comprises: error calculation means for calculating an error of a scanning line position on an image carrier in a sub-scanning direction, for a current line; update means, including a table which stores information indicating errors of scanning line positions on the image carrier for the current line and for a plurality of lines preceding the current line, for sequentially updating, by using the calculated error, information indicating the errors of the scanning line positions stored in the table; distance calculation means for calculating a distance between the scanning line position of the current line and scanning line positions of lines near the current line on the image carrier by looking up the table; control means for calculating a correction rate of an exposure amount from the calculated distance and controlling an exposure amount for the current line using the correction rate; and coefficient setting means for setting, by looking up the table, a coefficient which is used when the distance calculation means calculates the distance.

According to one aspect of the present invention, high-precision banding correction can be performed.

According to another aspect of the present invention, density variations depending on the dot density can be suppressed to reduce banding, and a decrease in the density of an isolated point, upon suppressing density variations for banding, can be suppressed.

According to still another aspect of the present invention, density variations depending on the scanning line density can be suppressed to reduce banding.

Further features of the present invention will become apparent from the following description of exemplary embodiments (with reference to the attached drawings).

BRIEF DESCRIPTION OF DRAWINGS

FIG. 6 is a schematic view exemplifying an optical position sensor;

FIGS. 7A and 7B are tables exemplifying a scanning line position table;

FIG. 8 is a schematic view showing the relationship between the scanning line position and the scanning line interval in the first embodiment;

FIG. 10 is a schematic view showing the operation order of processes performed by the image forming apparatus;

FIG. 11 is a block diagram showing an arrangement regarding banding correction in the second embodiment;

FIG. 12 is a flowchart showing exposure amount correction processing in the second embodiment;

FIGS. 13A and 13B are tables exemplifying a scanning line position table in the second embodiment;

FIG. 14 is a schematic view showing the relationship between the scanning line position and the scanning line interval in the second embodiment;

FIG. 18 is a block diagram explaining an example of an arrangement which performs exposure amount control in the third embodiment;

FIG. 19 is a schematic view explaining processing of calculating a scanning line interval in the third embodiment;

FIGS. 20A and 20B are graphs explaining a predicted density in the third embodiment;

FIG. 22 is a view explaining an example of the arrangement of an image forming apparatus in the fifth embodiment;

FIG. 28 is a flowchart explaining calibration in the fifth embodiment;

DESCRIPTION OF EMBODIMENTS

Embodiments of the present invention will now be described with reference to the accompanying drawings. It is to be understood that the following embodiments are not intended to limit the claims of the present invention, and that not all combinations of features described in the embodiments are indispensable for solving the problems in the present invention.

First Embodiment

Apparatus Arrangement

Figure 1:
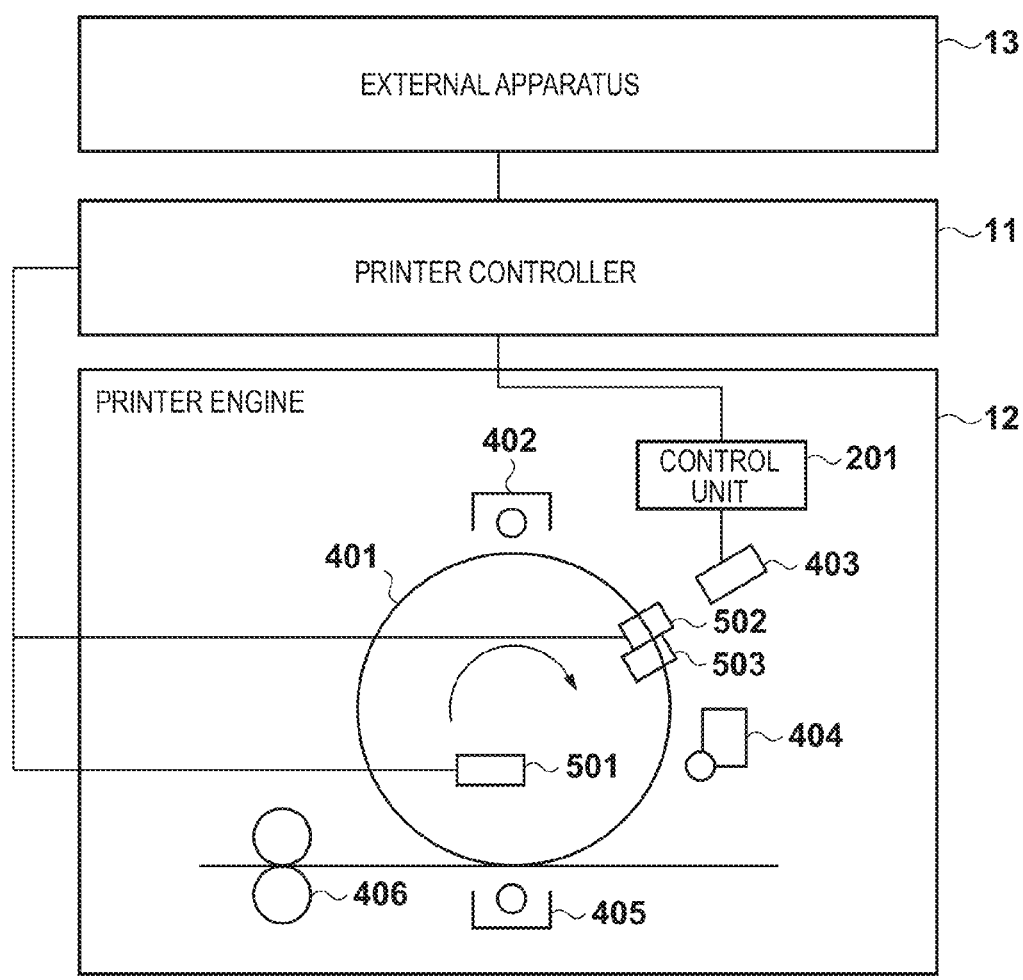
FIG. 1 is a view showing the schematic arrangement of an image forming apparatus in the first embodiment.

FIG. 1 is a view showing the arrangement of an image forming apparatus (an image processing apparatus) in the first embodiment. Referring to FIG. 1, an external apparatus 13 includes an interface with a hard disk drive, computer, server, network, or the like (none are shown), and inputs image data to a printer controller 11. The printer controller 11 receives input image data and performs halftone processing, exposure amount calculation processing, and exposure amount correction processing, details of which will be described later. The printer controller 11 transmits/receives a control instruction and information to/from a printer engine 12, and transmits image data to it.

The printer engine 12 includes a printer engine control unit 201, devices, and sensors. The devices are motors and the like used to drive the image carrier and paper conveyance system. The sensors are an encoder, optical position sensor, and the like. The printer engine control unit 201 controls the respective devices in accordance with inputs from the printer controller 11 and pieces of information from the respective sensors. The printer engine 12 exposes and scans, in the main scanning direction that is perpendicular to the sub-scanning direction, the charged image carrier moving in the sub-scanning direction, thereby forming an image of a plurality of scanning lines on the image carrier.

The internal arrangement of the printer engine 12 shown in FIG. 1 will be explained. The printer engine 12 includes the printer engine control unit 201. A photosensitive drum 401 serves as an image carrier used in charging, exposure, development, and transfer in an electrophotographic process. A charger 402 charges the photosensitive drum 401. A laser scanner 403 drives a semiconductor laser in accordance with input image data, and exposes and scans the photosensitive drum 401 using a polygon mirror, forming an electrostatic latent image. A developing unit 404 develops, with toner, the electrostatic latent image formed on the photosensitive drum 401. A transfer unit 405 transfers the toner image on the photosensitive drum 401 onto a printing medium such as paper. A fixing unit 406 fixes, by heat and pressure, the toner image transferred on the printing medium. An encoder 501 detects the rotational position (drum position) of the photosensitive drum 401. An optical position sensor 502 detects the position of laser irradiation by the laser scanner 403 in the sub-scanning direction. A BD sensor 503 detects the laser irradiation and outputs a BD signal (horizontal sync signal).

In the embodiment, the image forming apparatus is formed from only a single image forming station (including the photosensitive drum 401, charger 402, and developing unit 404) for descriptive convenience. Generally in a color image forming apparatus, image forming stations corresponding to respective colors such as cyan, magenta, yellow, and black are arrayed sequentially above the transfer unit 405 in the moving direction. Alternatively, developing units 404 of respective colors are arranged around one photosensitive drum 401. In some cases, developing units 404 of respective colors are arranged in a rotatable housing, and a desired developing unit 404 faces the photosensitive drum 401 to develop an image in a desired color.

Figure 2:
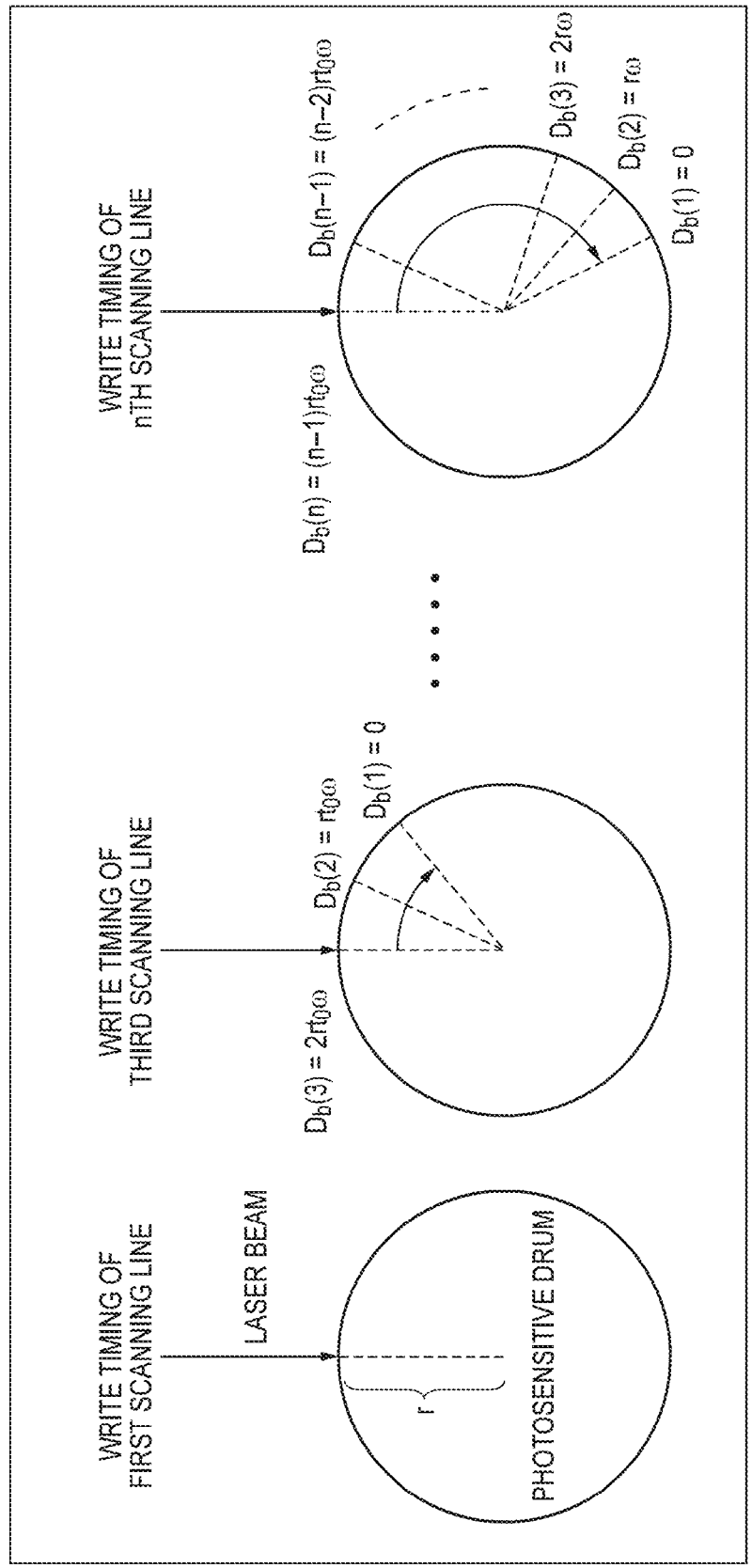
FIG. 2 is a schematic view showing a scanning line position on a photosensitive drum.

Each image forming station forms an image by exposing a rotating image carrier (to be referred to as a drum) such as a photosensitive drum with a laser beam or the like. At this time, scanning lines are formed at equal intervals by controlling the rotational speed of the drum to be constant and controlling the interval between the write timings of respective scanning lines by a laser beam to be constant. Details of this will be explained with reference to FIG. 2. A drum shown in FIG. 2 has a radius r and is controlled to rotate at a predetermined angular velocity $\omega$. The interval between the write timings of respective scanning lines is controlled to be constant at to. First, the first scanning line is scanned. At this write timing, the time is defined as 0, and the scanning line position on the surface of the photosensitive body is defined as 0. The write timing to scan the second scanning line is defined as time t0, and the rotation angle of the drum is defined as t0$\omega$. Then, the scanning line position on the drum surface is rt0$\omega$ from the relationship between the angle and the arc length. At the write timing to scan the third scanning line, the time is 2t0, and the drum has rotated by 2t0$\omega$, as shown in FIG. 2. Thus, the scanning line position on the drum surface is 2rt0$\omega$. Similarly, the time t(n) at the write timing to scan the nth scanning line and a scanning line position Db(n) on the drum surface can be calculated by equations (1) and (2):

$$t(n)=(n-1)t0 \quad (1)$$

$$Db(n)=(n-1)rt0\omega \quad (2)$$

Figure 3A:
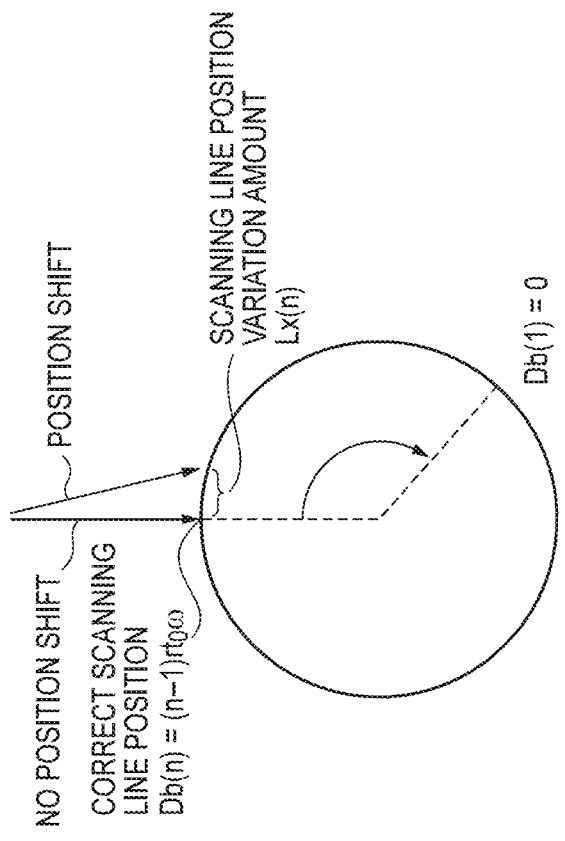
FIGS. 3A and 3B are schematic views showing variations of the scanning line position on the photosensitive drum.
Figure 3B:
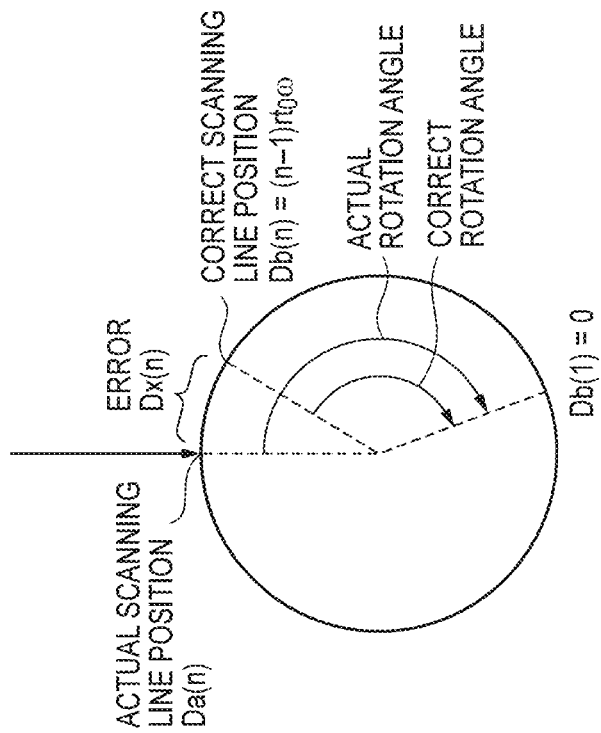

In the above way, the image forming apparatus performs various control operations to make the scanning line interval constant at rt0$\omega$. However, the scanning line interval sometimes has an error due to various causes. A main cause is a laser irradiated position error generated by variations of the rotational speed of the drum and the plane tilt (angle variations of a plurality of reflecting surfaces) of the polygon mirror. FIGS. 3A and 3B show occurrence of a laser irradiated position error by variations of the rotational speed of the drum and the plane tilt of the polygon mirror. As shown in FIG. 3A, when the rotational speed of the drum changes, an actual scanning line position Da(n) on the drum surface differs from the scanning line position Db(n) obtained from equation (2). In FIG. 3A, the correct position of the nth scanning line should be Db(n). However, when the rotation angle of the drum becomes large, the actual scanning line position becomes Da(n), and the scanning line position has an error Dx(n). If the reflection angle of a laser beam changes owing to the plane tilt of the polygon mirror, as shown in FIG. 3B, an error occurs in the laser irradiated position. In FIG. 3B, the nth scanning line position free from an irradiated position shift is supposed to be Db(n). However, if an irradiated position shift occurs, the scanning line position varies (variation amount Lx(n)) by the shift.

Outline of Banding Correction

Figure 15A:
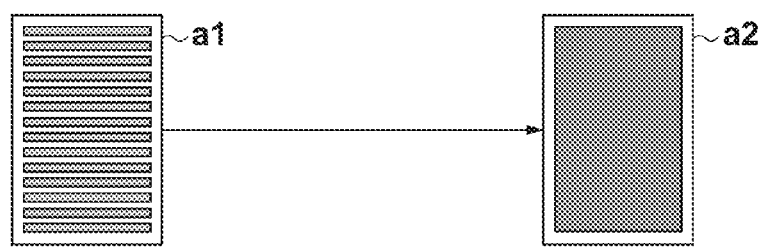
FIGS. 15A to 15C are schematic views showing an outline of banding correction.
Figure 15B:
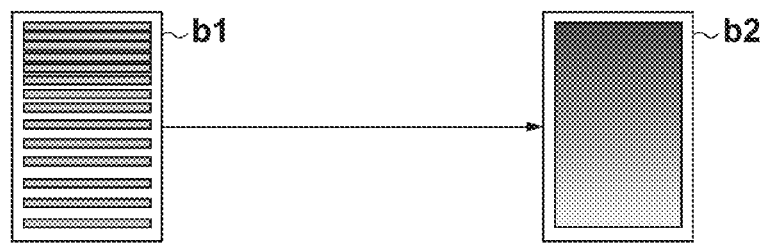
Figure 15C:
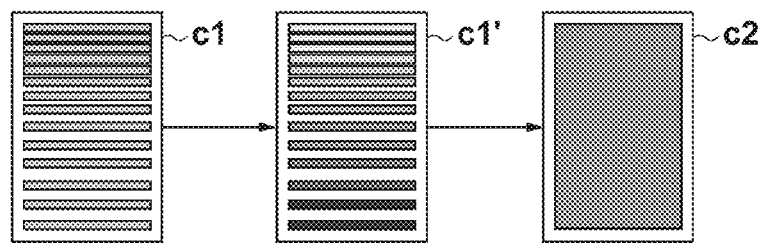
Figure 16:
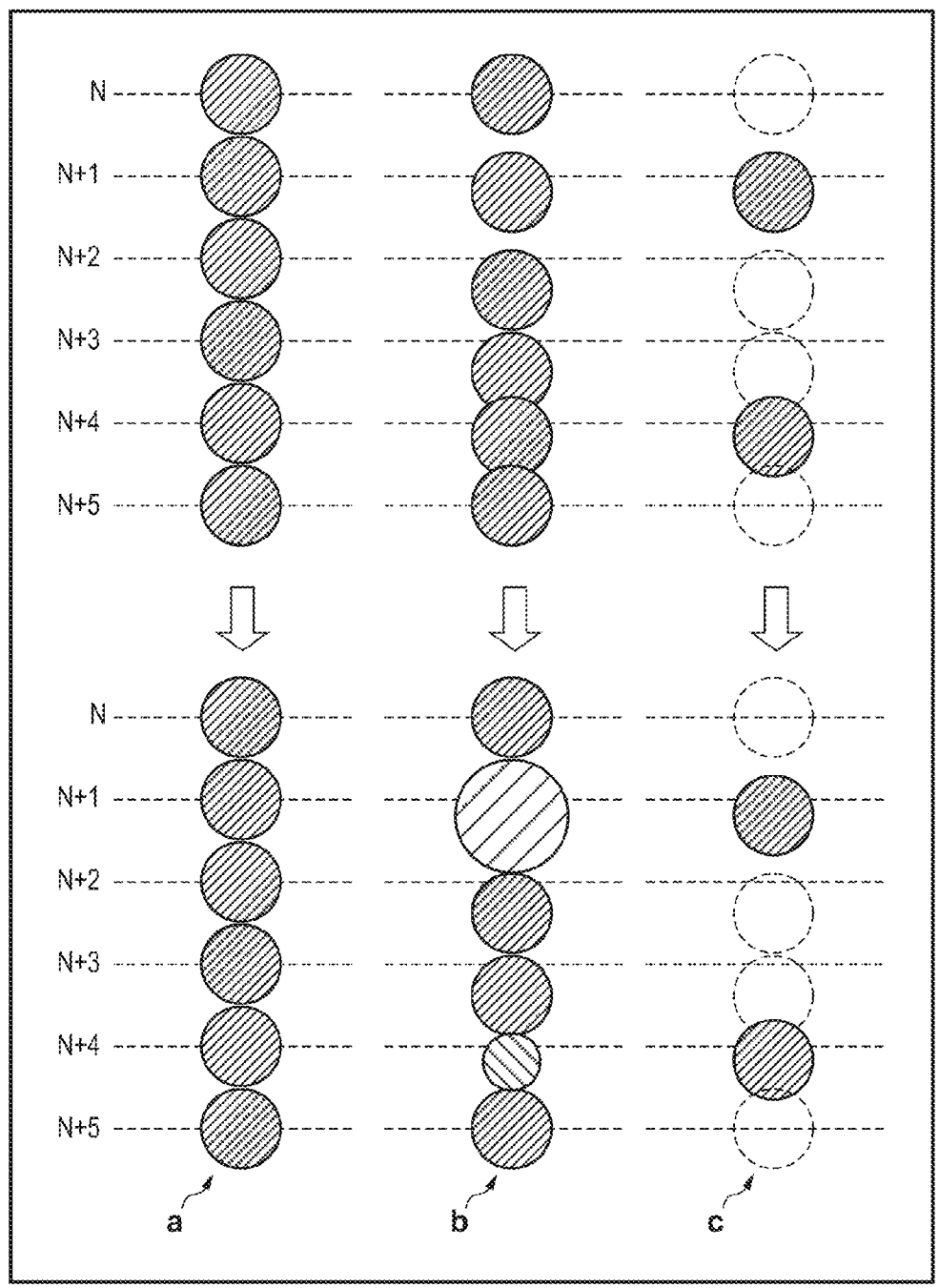
FIG. 16 is a schematic view explaining density correction.

An outline of banding correction in the embodiment will be explained with reference to the schematic views of FIGS. 15A to 15C. FIG. 15A is a view exemplifying ideal image formation. When the laser is scanned at equal intensities and equal scanning line intervals, as represented by a1, an image can be formed at a uniform density, as represented by a2. In practice, however, scanning line intervals are not equal and contain an error, as shown in FIG. 15B, so scanning line intervals vary, as represented by b1. At this time, even if the laser irradiation intensity is constant, a formed image becomes dark at a portion having a small scanning line interval and light at a portion having a large scanning line interval, as represented by b2. In this fashion, the density changes depending on the scanning line interval within an image, generating banding.

The image forming apparatus in the embodiment corrects the banding by adjusting the laser beam amount (exposure amount). FIG. 15C exemplifies banding correction according to the embodiment. More specifically, banding is corrected so that laser scanning is performed while changing the irradiation intensity as represented by c1' in accordance with the scanning line interval, when a laser scanning has variations of the scanning line interval as represented by c1 which is similar to b1. In c1', the laser irradiation intensity is controlled to be low at a portion having a small scanning line interval and high at a portion having a large scanning line interval. Banding is therefore corrected by canceling density variations of a formed image caused by variations of the scanning line interval, as represented by c2.

Exposure Amount Correction Processing

As described above, the embodiment corrects banding by correcting the exposure amount in accordance with the scanning line interval. Exposure amount correction processing in the embodiment will be explained.

Figure 5:
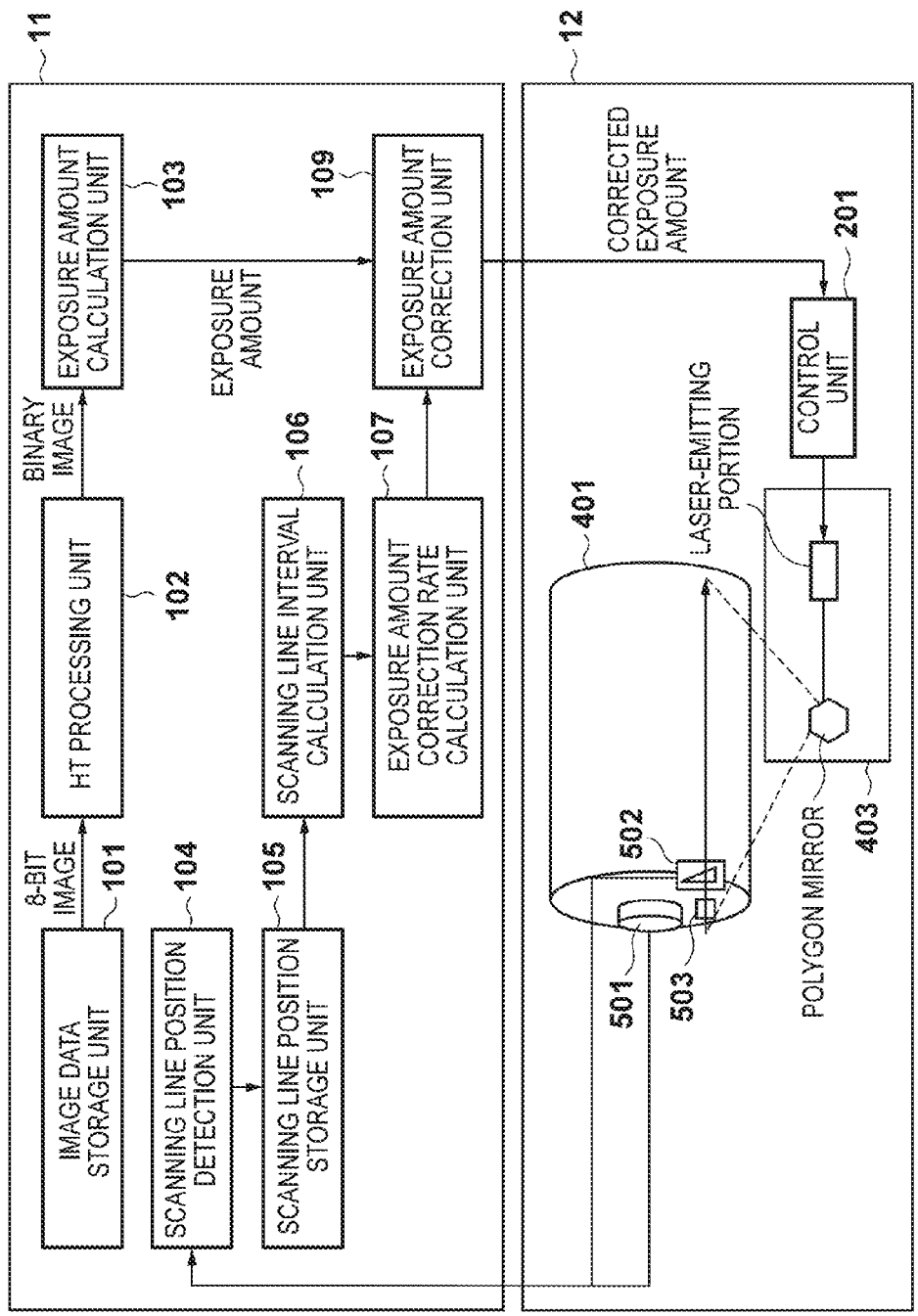
FIG. 5 is a block diagram showing an arrangement regarding banding correction in the first embodiment.

FIG. 5 is a block diagram showing an arrangement particularly regarding banding correction in the image forming apparatus shown in FIG. 1 according to the first embodiment. The same reference numerals as those in FIG. 1 denote the same parts. In the printer controller 11, an image data storage unit 101 stores, for example, an 8-bit image to be formed. A halftone processing unit 102 performs well-known halftone processing for an 8-bit multi-level image from the image data storage unit 101 to convert the multi-level image into, for example, a binary image. An exposure amount calculation unit 103 calculates an exposure amount corresponding to the binary image. A scanning line position detection unit 104 dynamically detects the rotation angle $\theta$ of the photosensitive drum 401 in the printer engine 12, calculates current scanning line position information, and stores it in a scanning line position storage unit 105, details of which will be described later. A scanning line interval calculation unit 106 calculates a scanning line interval from pieces of scanning line position information stored in the scanning line position storage unit 105. An exposure amount correction rate calculation unit 107 calculates an exposure amount correction rate based on the scanning line interval. An exposure amount correction unit 109 corrects an actual exposure amount in accordance with the exposure amount correction rate. The exposure amount corrected by the exposure amount correction unit 109 is sent to the printer engine 12, and reflected in actual laser scanning.

Figure 4:
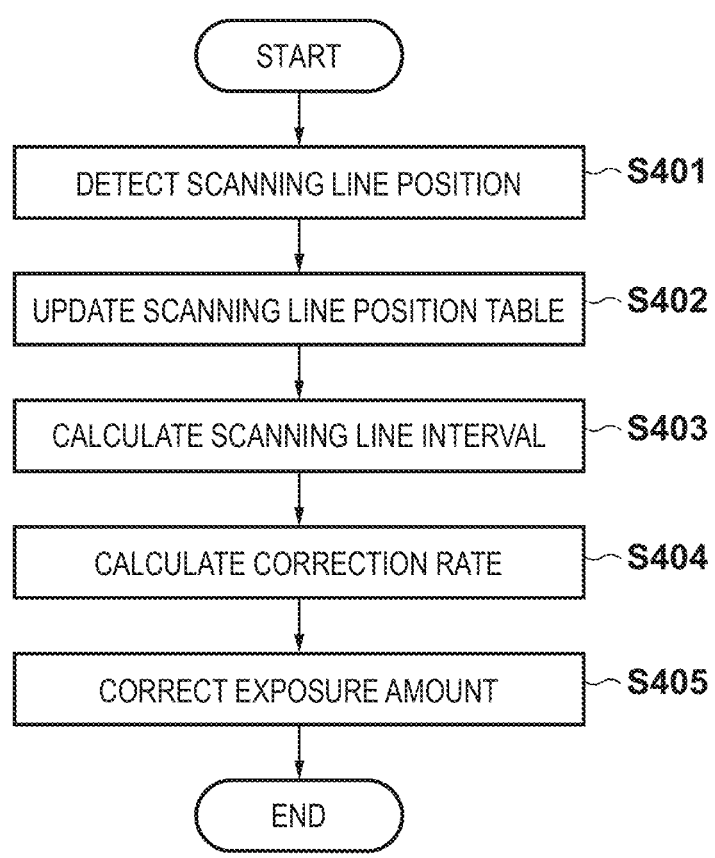
FIG. 4 is a flowchart showing exposure amount correction processing in the first embodiment.

The sequence of exposure amount correction processing according to the embodiment will be explained with reference to the flowchart of FIG. 4. Note that the processing shown in FIG. 4 is executed in every laser beam scanning, that is, when scanning the nth scanning line. For one image, the processing shown in FIG. 4 is repeated by a count corresponding to the image height, that is, a pixel count in the sub-scanning direction.

In step S401, the scanning line position detection unit 104 acquires the rotation angle $\theta$ of the photosensitive drum 401 from the encoder 501, and calculates the scanning line position error Dx(n). Further, the scanning line position detection unit 104 acquires the laser irradiated position variation amount Lx(n) from the optical position sensor 502, and calculates a scanning line position error Px(n). Details of this calculation method will be described later. The scanning line position detection unit 104 outputs the calculated scanning line position error Px(n) to the scanning line position storage unit 105.

In step S402, upon receiving the scanning line position error Px(n), the scanning line position storage unit 105 updates a scanning line position table stored in advance. The scanning line position table stores in advance relative position information about a scanning line (to be referred to as an exposed scanning line) exposed and scanned before the theoretical scanning line position of the current scanning line (to be referred to as a scanning line of interest) that serves as a reference. In step S402, the scanning line position table is updated in accordance with the scanning line position error Px(n), details of which will be described later.

In step S403, the scanning line interval calculation unit 106 calculates the intervals between the scanning line of interest and neighboring scanning lines using the scanning line position table updated in step S402. More specifically, the scanning line interval calculation unit 106 calculates the first scanning line interval indicating the distance between the scanning line of interest and a scanning line (to be referred to as a succeeding scanning line) to be exposed after the scanning line of interest, and the second scanning line interval indicating the distance between the scanning line of interest and an exposed scanning line in the sub-scanning direction on the photosensitive drum 401. Details of the scanning line interval calculation processing will be described later.

In step S404, the exposure amount correction rate calculation unit 107 performs correction rate calculation processing corresponding to the scanning line interval, details of which will be described later.

In step S405, the exposure amount correction unit 109 corrects the exposure amount at the correction rate calculated in step S404. The correction processing complies with equation (14):

$$E'=R\cdot E \quad (14)$$

That is, the theoretical exposure amount E set for the scanning line of interest is multiplied by the calculated correction rate R, determining an exposure amount E' to be used this time.

Scanning Line Position Detection Processing (S401)

Scanning line position detection processing by the scanning line position detection unit 104 in step S401 will be explained in detail. First, the scanning line position detection unit 104 acquires, from the encoder 501, the rotation angle θ indicating the moving amount of the photosensitive drum 401. The encoder 501 generates pulse signals corresponding to rotation of the photosensitive drum 401, integrates them, and outputs the rotation angle θ of the photosensitive drum 401. The scanning line position detection unit 104 calculates, from the rotation angle θ based on equation (3), the actual scanning line position Da(n) which should be obtained when the laser irradiated position does not have an error:

$$Da(n)=r\cdot\theta \quad (3)$$

where r is the radius of the photosensitive drum 401.

As described above, the theoretical scanning line position Db(n) is given by the above-described equation (2). Thus, the error Dx(n) between the theoretical and actual values of the scanning line position is calculated from equation (4):

$$Dx(n)=Db(n)-Da(n) \quad (4)$$

Then, the scanning line position detection unit 104 acquires the laser irradiated position variation amount Lx(n) from the optical position sensor 502. FIG. 6 is a schematic view showing the optical position sensor 502. An outline of the optical position sensor 502 will be described. The optical position sensor 502 is formed by covering, with a triangular slit 601, a light-receiving element for outputting a pulse signal upon detecting a laser beam. The optical position sensor 502 outputs a signal of a pulse width corresponding to the scanning position. For example, when a laser beam irradiates a laser beam irradiation reference position 603, the optical position sensor 502 outputs a pulse signal of a width w1 serving as a reference pulse width. When a laser beam irradiates a position 604, the irradiated position shifts downward from the reference position 603. The time until the sensor receives the laser beam becomes long, and a pulse width w2 of the output signal becomes larger than the reference pulse width w1. The optical position sensor 502 calculates a laser irradiated position variation amount from the change of the pulse width. For example, the slit 601 is shaped into a right-angled triangle, and a side adjacent to the right angle is set parallel to the laser scanning direction. In this case, the irradiated position variation amount can be obtained by multiplying, by a proportional coefficient, the difference between the pulse width w2 and the reference pulse width w1 upon laser beam irradiation. The proportional coefficient is determined by the slope of the hypotenuse of the right-angled triangle. The proportional coefficient is 1 for a slope of 45°, and the pulse width difference directly serves as the laser irradiated position variation amount. In this manner, the irradiated position variation amount Lx can be obtained from the pulse width of a signal output from the optical position sensor 502.

After that, the scanning line position detection unit 104 calculates the scanning line position error Px(n) in accordance with equation (5):

$$Px(n)=Dx(n)+Lx(n) \quad (5)$$

The scanning line position detection unit 104 outputs the scanning line position error Px(n) to the scanning line position storage unit 105.

Scanning Line Position Table Update Processing (S402)

Scanning line position table update processing by the scanning line position storage unit 105 in step S402 will be explained in detail. FIG. 7A is a table exemplifying the scanning line position table stored in the scanning line position storage unit 105 when scanning the nth scanning line. This table stores, in correspondence with the scanning line number, relative position information about an exposed scanning line in the sub-scanning direction on the surface of the photosensitive drum 401 using the theoretical scanning line position of the scanning line of interest as a reference. For example, immediately before updating position information corresponding to a scanning line number n, pieces of position information when the (n−1)th scanning line was scanned last time are stored as pieces of position information corresponding to scanning line numbers n−1 and n−2. That is, relative position information using the theoretical scanning position of the (n−1)th scanning line as a reference is stored. These pieces of relative position information are updated so that the theoretical scanning position of the nth scanning line is used as a reference.

A detailed method of table update method processing will be explained. In processing of the scanning line number n, the scanning line position storage unit 105 updates relative position information corresponding to the scanning line number n−2 in accordance with equation (6):

$$P_n(n-2)=P_{n-1}(n-2)+X \quad (6)$$

where X is the reference scanning line interval indicating a scanning line interval which becomes theoretically constant when scanning lines are formed parallelly in the sub-scanning direction.

Similarly, the scanning line position storage unit 105 updates relative position information corresponding to the scanning line number n−1 in accordance with equation (7):

$$P_n(n-1)=P_{n-1}(n-1)+X \quad (7)$$

Then, the scanning line position storage unit 105 updates relative position information corresponding to the scanning line number n in accordance with equation (8) using the scanning line position error Px(n) acquired in step S401:

$$P_n(n) = Px(n) \quad (8)$$

As described above, the scanning line position storage unit 105 updates pieces of relative position information of the nth scanning line during processing and two preceding scanning lines, that is, three scanning lines.

Every time print processing for one image ends, the scanning line position table is initialized based on the reference scanning line interval X, as shown in FIG. 7B. This is because scanning line position information at the start of printing is not continuous from that in previous printing. The embodiment assumes that there is no scanning line position error as the initial value of the scanning line position table. However, the laser beam may scan in advance an area other than an image on the surface of the photosensitive drum 401 to obtain more accurate initial position information.

Scanning Line Interval Calculation Processing (S403)

Scanning line interval calculation processing by the scanning line interval calculation unit 106 in step S403 will be explained in detail. FIG. 8 is a schematic view showing the relationship between the scanning line position and the scanning line interval in the sub-scanning direction on the photosensitive drum 401. The scanning line interval calculation unit 106 calculates by prediction a first scanning line interval $\hat{G}(n,n+1)$ serving as the interval between the scanning line n of interest and the succeeding scanning line n+1 to be scanned immediately after it. The scanning line interval calculation unit 106 also calculates by prediction a second scanning line interval $\hat{G}(n,n-1)$ serving as the interval between the scanning line n of interest and the exposed scanning line n+1 scanned immediately before it. The actual value of the first scanning line interval $\hat{G}(n,n+1)$ should be calculated from the difference between position information $P_{n+1}(n+1)$ and position information $P_{n+1}(n)$. As the interval between scanning lines a and b, $\hat{G}(a,b)$ is an estimated value and $G(a,b)$ is an actual value. However, when scanning the nth scanning line, future information $P_{n+1}(n+1)$ cannot be acquired in processing. In the embodiment, therefore, the first scanning line interval $\hat{G}(n,n+1)$ and second scanning line interval $\hat{G}(n,n-1)$ are estimated using relative position information of the exposed scanning line that has already been detected and is stored in the scanning line position table.

A scanning line interval estimated value calculation equation in the embodiment will be exemplified. Equation (9) is a first scanning line interval estimated value calculation equation, and equation (10) is a second scanning line interval estimated value calculation equation:

$$\hat{G}(n,n+1) = P_n(n) - P_b(n-1) \quad (9)$$

$$\hat{G}(n,n-1) = P_n(n-1) - P_n(n-2) \quad (10)$$

This estimation is known as a linear prediction method. The linear prediction method predicts a future value by linear mapping of a value observed in advance. The linear prediction method is generally given by equation (11):

$$\hat{x}(k) = \Sigma a_i x(k-i) \quad (11)$$

where $\Sigma$ is the sum of the entire range of a variable i indicating the order, $\hat{x}(k)$ is the predicted value, $x(k-i)$ is a measured value observed in advance, and $a_i$ is the prediction coefficient.

Rewriting equation (11) in accordance with the embodiment yields equation (12).

$$\hat{G}(n,n+1) = \Sigma a_i G(n-i, n-i+1) \quad (12)$$

Generally in the linear prediction method, the prediction coefficient $a_i$ is a parameter, and a parameter which minimizes an error $|x(k) - \hat{x}(k)|$ is selected. In the embodiment, the prediction coefficient $a_i$ is set to 1 for i=1 and 0 for i≠1. The scanning line interval is estimated by applying equation (13) which is derived from equation (12):

$$\hat{G}(n,n+1) = G(n-1,n) \quad (13)$$

As represented by equation (9), the first scanning line interval $\hat{G}(n,n+1)$ is calculated as the difference between the scanning line position of interest and the immediately preceding scanning line position, that is, the difference between the relative positions $P_n(n)$ and $P_n(n-1)$. Similarly, as represented by equation (10), the second scanning line interval $\hat{G}(n,n-1)$ is calculated as the difference between $P_n(n-1)$ and $P_n(n-2)$.

As the prediction coefficient $a_i$, a proper one of measured values acquired in advance can be selected. In accordance with the prediction coefficient $a_i$, the number of relative position information stored in the scanning line position table can be changed. The embodiment employs the linear prediction method as the scanning line interval prediction method. However, another prediction method is also available, including a method using a Kalman filter or a method using a simulator which simulates the motion of the image forming apparatus.

Correction Rate Calculation Processing (S404)

Processing of calculating the correction rate R in step S404 will be described in detail. In correction rate R calculation processing, the correction rate R used to correct the exposure amount is calculated to reduce banding generated owing to a scanning line interval error. More specifically, the correction rate R is set so that the following predicted densities OD1 and OD2 at the scanning line position of interest become equal to each other. OD1 is a predicted density at the scanning line position of interest in a formed image upon exposure at the theoretical exposure amount E in the absence of a scanning line interval error. OD2 is a predicted density at the scanning line position of interest in a formed image upon exposure at the corrected exposure amount R·E in the presence of a scanning line interval error. The predicted densities OD1 and OD2 are predicted from equations (15) and (16) using the interval between the scanning line of interest and the neighboring scanning line:

$$OD1 = sh(0) + \Sigma sh(iX) \quad (15)$$

$$OD2 = R \times sh(0) + \Sigma sh(\hat{G}(n,n+1)) \quad (16)$$

where sh is a function indicating a density distribution when an isolated dot is printed at the theoretical exposure amount E, and X is the reference scanning line interval. The variation range of i is {−1,1}.

Figure 9A:
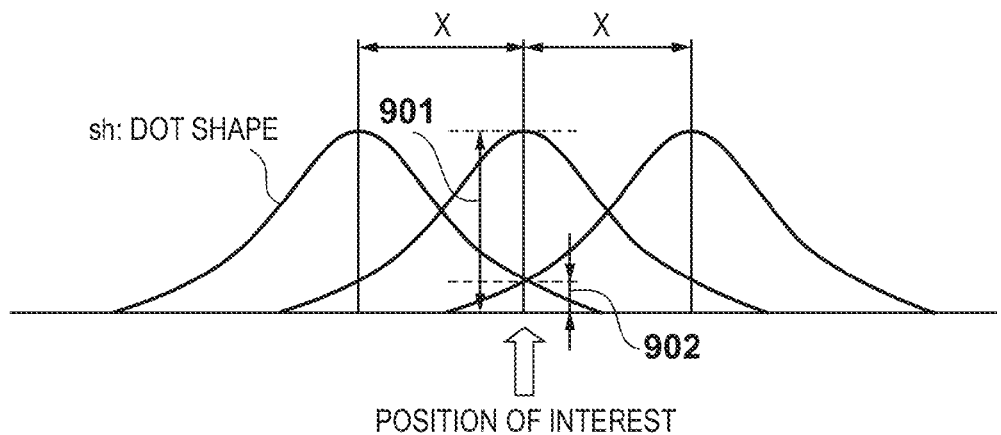
FIGS. 9A and 9B are graphs showing the concept of correction rate calculation processing in the first embodiment.
Figure 9B:
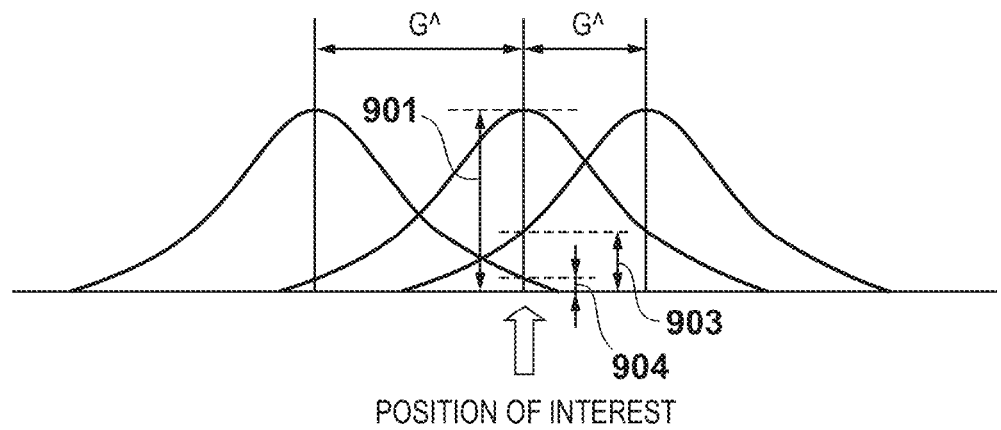

Equations (15) and (16) will be described in detail with reference to FIGS. 9A and 9B. As dots printed on neighboring scanning lines, FIGS. 9A and 9B show only those of preceding and succeeding scanning lines. Respective scanning lines are printed at a predetermined width to overlap each other. The density at a given scanning line position is calculated as the sum of the densities of neighboring scanning lines including the given scanning line at the position of interest. The first term of the right-hand side of equation (15) indicates the density at the position of interest when the given scanning line is exposed at the theoretical exposure amount E. This density corresponds to a density 901 in FIG. 9A. The first term of the right-hand side of equation (16) means that the given scanning line is exposed at the corrected exposure amount R·E. The density becomes R times higher upon R-times exposure. The $\Sigma$ term of the right-hand side of equation (15) indicates the sum of the densities of neighboring scanning lines at the position of interest in the absence of a scanning line position error. This density sum corresponds to a density sum 902 in FIG. 9A. The Σ term of the right-hand side of equation (16) indicates the sum of the densities of neighboring scanning lines at the position of interest in the presence of a scanning line position error. This density sum corresponds to the sum of densities 903 and 904 in FIG. 9B. As shown in FIGS. 9A and 9B, the densities 902, 903, and 904 depend on the interval between the given scanning line and the neighboring scanning line. Thus, the density 902 differs from the density 903 and also from the density 904.

As a density at the position of interest within neighboring scanning lines, the sum of the densities of all scanning lines in the image needs to be calculated. However, the density value of a scanning line spaced apart to some extent is sufficiently small and can be ignored. In the embodiment, the sum of the densities of only scanning lines immediately preceding and succeeding the scanning line of interest is calculated.

In the embodiment, the correction rate R which makes OD1 obtained from equation (15) and OD2 obtained from equation (16) equal to each other is calculated according to equation (17):

$$R=1+\{1/sh(0)\}\cdot\Sigma\{sh(iX)-sh(G\hat{}(n,n+i))\} \quad (17)$$

where $G\hat{}(n,n+i)$ is the first scanning line interval $G\hat{}(n,n+1)$ and second scanning line interval $G\hat{}(n,n-1)$ obtained in step S403.

Processing Timing

The embodiment implements banding correction by correcting the exposure amount in the above-described way. The processing timing of each unit along with exposure amount correction in the embodiment will be described.

FIG. 10 is a view schematically showing the operation timing of each processing in the image forming apparatus according to the embodiment. In FIG. 10, reference numeral 1001 denotes a printing medium; and 1002, an image area formed on the printing medium 1001. Reference numeral 1003 denotes a main scanning line of a laser beam in image formation. FIG. 10 shows that the image area 1002 on the printing medium 1001 is scanned after the laser beam passes through the optical position sensor 502.

The timing of each processing in scanning one main scanning line will be explained. First, a laser signal 1004 can be divided into an image signal 1008, and a detection signal 1007 for detecting a BD signal (horizontal sync signal). Upon receiving the laser signal 1004, the laser diode of the laser scanner 403 emits light. The detection signal 1007 rises before the timing when the BD sensor 503 is to be scanned with the laser beam. When the BD sensor 503 detects the laser beam, it generates a BD signal 1005. The laser signal 1004 is output as the detection signal 1007 for a time 1009 enough to end scanning the laser beam by the optical position sensor 502 after the detection timing of the BD signal 1005. Then, the laser signal 1004 is output as the image signal 1008 a predetermined time 1010 after the detection timing of the BD signal 1005. The predetermined time 1010 depends on the installation position of the optical position sensor 502 with respect to the photosensitive drum 401, the rotational speed of the polygon mirror, and the like. The predetermined time 1010 needs to be long enough to correct the exposure amount by the printer controller 11.

The optical position sensor 502 detects the sub-scanning position of the laser beam, and outputs it to the scanning line position detection unit 104 at a timing indicated by a laser position detection signal 1006. The encoder 501 detects the rotation angle of the photosensitive drum 401, and outputs it to the scanning line position detection unit 104 at a timing indicated by a drum position detection signal 1011. The exposure amount correction unit 109 adjusts the laser beam amount based on detection results indicated by the laser position detection signal 1006 and drum position detection signal 1011, outputting the laser signal 1004 as the image signal 1008.

Modification

In the first embodiment, the scanning line position table stored in the scanning line position storage unit 105 stores position information of each scanning line in the sub-scanning direction on the surface of the photosensitive drum 401 using the theoretical scanning line position of the scanning line of interest as a reference. However, the contents of the scanning line position table are not limited to this example. For example, the scanning line position table may store the distance from an immediately preceding scanning line on the surface of the photosensitive drum 401. Also in the above example, the scanning line position table stores three scanning line positions. However, the number of stored scanning line positions is not limited to this, and the number of scanning lines whose scanning line positions are stored is arbitrary.

In the first embodiment, correction rate calculation processing in step S404 uses two scanning line intervals between the scanning line of interest and two, immediately preceding and succeeding scanning lines. However, even the number of scanning line intervals is not limited to this example. The number of scanning line intervals for use is arbitrary as long as prediction is possible from the intervals between exposed and succeeding scanning lines including the scanning line of interest. The dot density is assumed to be proportional to the exposure amount E and correction rate R. However, if this relationship does not hold, equivalent processing can be achieved using a lookup table (LUT), function, or the like indicating the relationship between the exposure amount and the dot density. A predicted density at the position of interest on a scanning line is obtained from the sum of isolated dots. However, if this is impossible, the predicted density or correction rate may be calculated using an LUT created in advance. Equation (17) to calculate the correction rate R is premised on that the exposure amount of a neighboring scanning line has not been corrected. However, the correction amount of a neighboring scanning line can also be reflected in the equation by, for example, storing the correction rate R for every laser beam scanning.

In the first embodiment, all scanning line intervals are calculated by prediction in scanning line interval calculation processing of step S403. It is also possible to calculate some scanning line intervals by prediction and actually detect the remaining intervals for use. In other words, the scanning line intervals of succeeding scanning line positions $P_{n+1}$ and later which are not stored in the scanning line position table are calculated by prediction, and the remaining scanning line intervals are calculated from measured values. For example, the scanning line intervals of the scanning line position $P_n$ of interest and exposed scanning line positions preceding $P_n$ which are stored in the scanning line position table are calculated from actually detected scanning line position errors.

As described above, according to the first embodiment, the exposure amount correction rate is calculated using position error information of the scanning line of interest, and neighboring exposed and succeeding scanning lines. Variations of the image density by the density of scanning lines can be corrected by modulating the scanning line exposure intensity. High-precision banding correction can be achieved.

Second Embodiment

The second embodiment according to the present invention will be described. The first embodiment has described exposure amount correction in an image forming apparatus which performs exposure using one laser. The second embodiment will describe exposure amount correction in an image forming apparatus which includes a plurality of lasers for simultaneous scanning and performs interlaced exposure.

Apparatus Arrangement

The image forming apparatus (the image processing apparatus) in the second embodiment includes a multi-laser scanner 407 with a plurality of lasers, in place of the laser scanner 403 with one laser which is used in the arrangement shown in FIG. 1 in the first embodiment. The image forming apparatus in the second embodiment performs interlaced exposure to form a plurality of scanning lines at intervals each of a predetermined number of scanning lines by one exposure scanning of the multi-laser scanner 407.

FIG. 11 is a block diagram showing an arrangement particularly regarding banding correction in the image forming apparatus according to the second embodiment. The same reference numerals as those in FIG. 5 in the first embodiment denote the same parts, and a description thereof will not be repeated. More specifically, the arrangement in FIG. 11 is different from that in FIG. 5 only in that the multi-laser scanner 407 replaces the laser scanner 403.

The multi-laser scanner 407 drives three semiconductor lasers in accordance with input image data to simultaneously scan a photosensitive drum 401 via the polygon mirror and form a latent image. The multi-laser scanner 407 performs interlaced exposure divided into two. The interlaced exposure is an exposure method of repeating interlaced scanning at an interval of a predetermined number of scanning lines, instead of scanning an image sequentially from the top. The scanning count necessary to fill the interlaced scanning interval is called a division number. The second embodiment will exemplify a case in which three semiconductor lasers are driven to perform interlaced exposure divided into two. More specifically, in the kth scanning, a scanning line 3k+2 is scanned using a laser A, a scanning line 3k is scanned using a laser B, and a scanning line 3k−2 is scanned using a laser C. In the next (k+1)th scanning, a scanning line 3k+5 is scanned using the laser A, a scanning line 3k+3 is scanned using the laser B, and a scanning line 3k+1 is scanned using the laser C. That is, six scanning lines 3k−2, 3k, 3k+1, 3k+2, 3k+3, and 3k+5 are formed by two, kth and (k+1)th scanning operations, interlaced intervals are filled from 3k to 3k+3, and all scanning lines are formed. In every scanning, the photosensitive drum 401 rotates by a rotation angle corresponding to three scanning lines.

Exposure Amount Correction Processing

Exposure amount correction processing in the second embodiment will be explained in detail with reference to the flowchart of FIG. 12.

In step S1401, a scanning line position detection unit 104 performs scanning line position detection processing. More specifically, the scanning line position detection unit 104 executes the same processing as that in step S401 of the first embodiment for the three lasers in every scanning. The scanning line position detection unit 104 calculates scanning line position errors P×A, P×B, and P×C of the respective lasers A, B, and C and outputs them to a scanning line position storage unit 105.

In step S1402, the scanning line position storage unit 105 updates a scanning line position table stored in advance. FIG. 13A exemplifies the scanning line position table in the second embodiment. This table stores, in correspondence with the scanning line number, relative position information of each scanning line in the sub-scanning direction on the surface of the photosensitive drum 401 using the theoretical scanning line position of a scanning line by the laser A as a reference in the current scanning (scanning of interest). In the second embodiment, when the laser A scans a scanning line n, a scanning line n−1 is to be exposed in the next scanning and has not been scanned yet, and thus its position information is not held in the table.

Scanning line position table update processing in the second embodiment will be explained in detail. The scanning line position storage unit 105 updates the positions of scanning lines n−5 and n−3 according to equations (18) and (19) using a reference scanning line interval X:

$$P(n-5)=P(n-2)+3X \quad (18)$$

$$P(n-3)=P(n)+3X \quad (19)$$

According to equations (18) and (19), the position of the scanning line n−3 is calculated by adding three times of the reference scanning line interval X to the position of the scanning line n that has been stored in previous updating. The position of the scanning line n−5 is calculated by adding three times of the reference scanning line interval X to the position of the scanning line n−2 that has been stored in previous updating. This is because the photosensitive drum 401 rotates by three scanning lines in every scanning.

Then, the scanning line position storage unit 105 updates the relative positions of the scanning lines n−4, n−2, and n according to equations (20) to (22) using scanning line position errors:

$$P(n-4)=P \times C+4X \quad (20)$$

$$P(n-2)=P \times B+2X \quad (21)$$

$$P(n)=P \times A \quad (22)$$

where P×A, P×B, and P×C are the scanning line position errors of the lasers A, B, and C that have been calculated in step S1401.

Similar to the first embodiment, every time print processing for one image ends, even the scanning line position table in the second embodiment is initialized based on the reference scanning line interval X, as shown in FIG. 13B.

After the end of scanning line position table update processing in step S1402, the exposure amount of the laser B is corrected in steps S1403 to S1405, and that of the laser C is corrected in steps S1406 to S1408. The second embodiment implements banding correction by correcting the exposure amounts of the lasers B and C without correcting the exposure amount of the laser A. A feature of the second embodiment is to perform banding correction using a scanning line (scanning line by the laser C) sandwiched between two exposed scanning lines as the scanning line of interest in the first embodiment, out of a plurality of scanning lines formed by scanning of interest. However, banding correction is possible by simple prediction using a scanning line (scanning line by the laser B) adjacent to at least one exposed scanning line. Hence, exposure amount correction for the lasers B and C will be exemplified.

Exposure amount correction for the laser B will be explained. In step S1403, a scanning line interval calculation unit 106 calculates the intervals between a scanning line by the laser B and neighboring scanning lines in scanning of interest. FIG. 14 schematically shows the relationship between the scanning line position and the scanning line interval in the second embodiment. The scanning line interval calculation unit 106 calculates a first scanning line interval G^(n−2,n−1) between the scanning line n−2 by the laser B and the immediately succeeding scanning line n−1 according to equation (23):

$$G\hat{\ }(n-2,n-1)=X \quad (23)$$

Also, the scanning line interval calculation unit 106 calculates a second scanning line interval G^(n−2,n−3) between the scanning line n−2 and the immediately preceding scanning line n−3 according to equation (24):

$$G\hat{}(n-2,n-3)=P(n-2)-P(n-3) \quad (24)$$

The actual value of the first scanning line interval G(n−2, n−1) can be calculated from the difference between P(n−1) and P(n−2). In the second embodiment, this value is predicted as the reference scanning line interval X, as represented by equation (23). This is because the scanning line n−1 has not been printed yet and its relative position P(n−1) cannot be acquired. Note that the embodiment assumes that no position error occurs on the scanning line n−1.

In step S1404, an exposure amount correction rate calculation unit 107 calculates the correction rate RB of the laser B. The correction rate RB for the exposure amount of the laser B is calculated based on equation (25) to reduce banding generated owing to a scanning line interval error:

$$RB=1+\{1/sh(0)\}\cdot\Sigma\{sh(iX)-sh(G\hat{}(n-2,n-2+i))\} \quad (25)$$

where sh is a function indicating a density distribution when an isolated dot is printed at the theoretical exposure amount EB of the laser B, and X is the reference scanning line interval. The variation range of i is {−1,1}. G^(n−2,n−2+i) is the first scanning line interval G^(n−2,n−1) and second scanning line interval G^(n−2,n−3) that have been obtained in step S1403. The derivation of equation (25) can be easily analogized from that of equation (17) in the first embodiment, and a description thereof will be omitted.

In step S1405, an exposure amount correction unit 109 corrects the exposure amount of the laser B at the correction rate RB of the laser B that has been calculated in step S1404. The correction processing complies with equation (26):

$$EB'=RB\cdot EB \quad (26)$$

That is, the theoretical exposure amount EB of the laser B is multiplied by the calculated correction rate RB, determining an exposure amount EB' to be used this time.

After the end of exposure amount correction for the laser B, exposure amount correction for the laser C is performed. First, in step S1406, the scanning line interval calculation unit 106 calculates the intervals between a scanning line by the laser C and neighboring scanning lines in scanning of interest using information of the scanning line position table updated in step S1402. More specifically, the scanning line interval calculation unit 106 calculates a first scanning line interval G^(n−4,n−3) between the scanning lines n−4 and n−3, and a second scanning line interval G^(n−4,n−5) between the scanning lines n−4 and n−5 in accordance with equations (27) and (28):

$$G\hat{}(n-4,n-3)=P(n-3)-P(n-4) \quad (27)$$

$$G\hat{}(n-4,n-5)=P(n-4)-P(n-5) \quad (28)$$

In step S1407, the exposure amount correction rate calculation unit 107 calculates the correction rate RC of the laser C. The correction rate RC for the exposure amount of the laser C is calculated based on equation (29) to reduce banding generated owing to a scanning line interval error:

$$RC=1+\{1/sh(0)\}\cdot\Sigma\{sh(iX)-sh(G\hat{}(n-4,n-4+i))\} \quad (29)$$

where sh is a function indicating a density distribution when an isolated dot is printed at the theoretical exposure amount EC of the laser C, and X is the reference scanning line interval. The variation range of i is {−1,1}. G^(n−4,n−4+i) is the first scanning line interval G^(n−4,n−3) and second scanning line interval G^(n−4,n−5) that have been obtained in step S1406. Even the derivation of equation (29) can be easily analogized from that of equation (17) in the first embodiment, and a description thereof will be omitted.

In step S1408, the exposure amount correction unit 109 corrects the exposure amount of the laser C at the correction rate RC of the laser C that has been calculated in step S1407. The correction processing complies with equation (30):

$$EC'=RC\cdot EC \quad (30)$$

That is, the theoretical exposure amount EC of the laser C is multiplied by the calculated correction rate RC, determining an exposure amount EC' to be written this time.

As described above, according to the second embodiment, the exposure amount correction rate of each laser is calculated to modulate the exposure intensity using position error information of the scanning line of interest and already-scanned neighboring scanning lines in the image forming apparatus which performs interlaced exposure using a multi-laser. High-precision banding correction can therefore be performed based on not a predicted value but a measured value as the scanning line interval between the scanning line of interest and the neighboring scanning line.

In the second embodiment, exposure amount correction is done for the scanning line of the laser C sandwiched between two exposed scanning lines and the scanning line of the laser B adjacent to at least one exposed scanning line, out of a plurality of scanning lines in scanning of interest. However, it is also possible to perform exposure amount correction only for the scanning line of the laser C without especially performing correction for the scanning line of the laser B as well as the scanning line of the laser A.

The second embodiment has exemplified an arrangement in which the number of simultaneously scanned lasers is three and the division number in interlaced exposure is two. However, the present invention is not limited to this example and is applicable as long as a plurality of lasers are simultaneously scanned and the division number is more than one.

Third Embodiment

Exposure Amount Control

Figure 17:
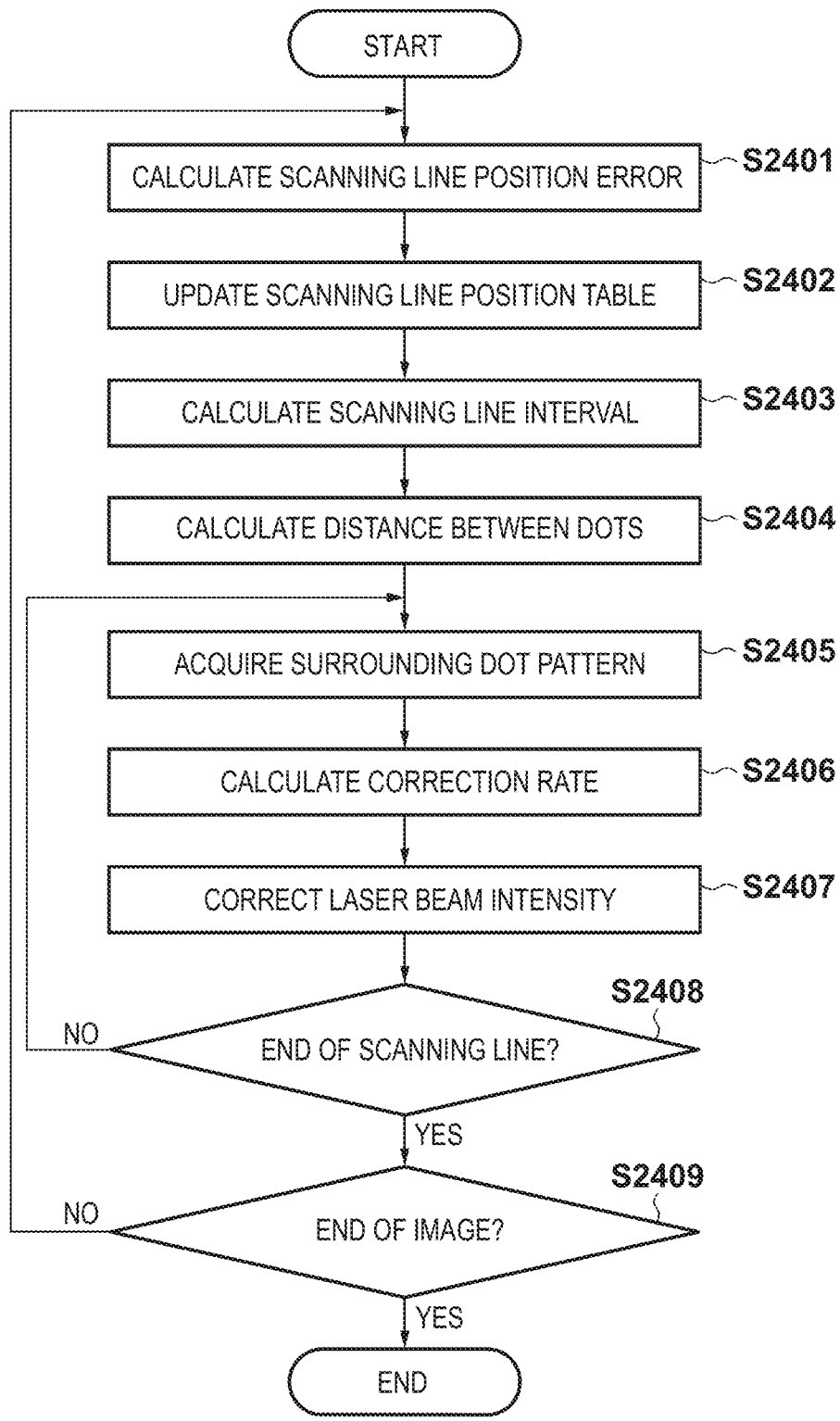
FIG. 17 is a flowchart explaining exposure amount control in the third embodiment.

Exposure amount control in the third embodiment will be described with reference to the flowchart of FIG. 17. The arrangement of an image forming apparatus (an image processing apparatus) in the third embodiment is the same as that shown in FIG. 1 in the first embodiment, and a description thereof will not be repeated. As described above, control (to be referred to as exposure amount control) of the intensity (or emission time) of a laser beam L needs to consider a dot pattern around the dot of interest. Note that processing shown in FIG. 17 is executed in every main scanning of the laser beam and repeated by the number of pixels (number of lines) of one image in the sub-scanning direction. An arrangement which performs exposure amount control will be exemplified with reference to the block diagram of FIG. 18.

A scanning line position calculation unit 2104 in a printer controller 11 calculates a scanning line position error on a scanning line n, and outputs the error to a scanning line position storage unit 2105 (step S2401).

First, the scanning line position calculation unit 2104 acquires the rotation angle θ' of a photosensitive drum 401 by integrating pulse signals corresponding to rotation of the photosensitive drum 401 that are generated by an encoder 501. Then, the scanning line position calculation unit 2104 calculates a scanning position Da(n) from the rotation angle θ' in accordance with equation (202):

$$Da(n)=r\cdot\theta' \quad (202)$$

Further, the scanning line position calculation unit 2104 calculates, in accordance with equation (203), a difference Dx(n) between a reference scanning line position Db(n) calculated from equations (1) and (2) and the scanning line position Da(n):

$$Dx(n)=Db(n)-Da(n) \quad (203)$$

Then, the scanning line position calculation unit 2104 acquires an irradiated position shift Lx(n) of the laser beam L from a sensor 502. The operation of the sensor 502 will be explained with reference to the schematic view of FIG. 6. The sensor 502 is formed by covering a light-receiving element with a triangular slit 601. The sensor 502 outputs a pulse signal of a width corresponding to the detection period of the laser beam L. When the irradiated position of the laser beam L scanned at a constant speed changes, the width of the pulse signal changes depending on the position. Hence, the irradiated position shift Lx(n) can be calculated from the width of the pulse signal. As shown in FIG. 6, when the laser beam L irradiates a reference irradiated position 603, the width of the pulse signal output from the sensor 502 is w1. If the laser beam L shifts by Lx(n) to an irradiated position 604, the width of the pulse signal output from the sensor 502 becomes w2.

From a change of the width of the pulse output from the sensor 502, the irradiated position shift Lx(n) of the laser beam L can be calculated. The slit 601 is shaped into a right-angled triangle, and a side adjacent to the right angle is set parallel to the laser scanning direction. In this case, the irradiated position shift Lx(n) is obtained by multiplying the difference between the pulse width w2 and the reference pulse width w1 by a proportional coefficient. The proportional coefficient is determined by the slope of the hypotenuse of the right-angled triangle. The proportional coefficient is 1 for a slope of 45°, and a distance equivalent to the pulse width difference serves as the irradiated position shift Lx(n). The scanning line position error Px(n) is given by $$Px(n)=Dx(n)+Lx(n) \quad (204)$$

Upon receiving the scanning line position error Px(n) of the scanning line n, the scanning line position storage unit 2105 sequentially updates the stored scanning line position table (step S2402).

The scanning line position table will be explained with reference to FIGS. 7A and 7B. As shown in FIG. 7A, the scanning line position table stores the scanning line positions $P_n(n)$, $P_n(n-1)$, and $P_n(n-2)$ of the current scanning line n, immediately preceding scanning line n−1, and second preceding scanning line n−2. Before updating, the scanning line position table stores the scanning line positions $P_{n-1}(n)$, $P_{n-1}(n-1)$, and $P_{n-1}(n-2)$ of the scanning lines n−1, n−2, and n−3. Upon receiving the scanning line position error Px(n) of the scanning line n, the scanning line position storage unit 2105 updates the scanning line position table according to equations (205):

second preceding line: $P_n(n-2)=P_{n-1}(n-1)+X$ immediately preceding line: $P_n(n-1)=P_{n-1}(n)+X$ current line: $P_n(n)=Px(n) \quad (205)$ where X is the reference scanning line interval.

Every time one image is printed, the scanning line position table is initialized as shown in FIG. 7B. This is because a scanning line position at the start of printing is not continuous from that in previous printing. FIG. 7B shows initial values in the absence of a scanning position error. However, the laser beam L may be scanned outside the image area to acquire a scanning position error at the start of printing.

A scanning line interval calculation unit 2106 calculates the intervals between the scanning line n and neighboring scanning lines (scanning lines n−1 and n+1) by looking up the updated scanning line position table (step S2403).

Processing of calculating a scanning line interval will be explained with reference to the schematic view of FIG. 19. The scanning line interval calculation unit 2106 acquires an interval G(n,n−1) between the scanning lines n−1 and n, and an interval G(n,n+1) between the scanning lines n and n+1. However, the scanning line position of the scanning line n+1 is unknown in scanning of the current scanning line (scanning line n). Therefore, predicted values G'(n,n−1) and G'(n,n+1) are calculated by linear prediction (equations (206)) using the scanning line positions of the scanning lines n−1 and n−2:

current line−preceding line:

$$G'(n,n-1)=P_n(n-1)-P_n(n-2)$$

current line−succeeding line:

$$G'(n,n+1)=P_n(n)-P_n(n-1) \quad (206)$$

The linear prediction method predicts a future value by linear mapping of a value observed in advance. The linear prediction method is generally given by a predicted value x'(k)

$$x'(k)=\Sigma a_i x(k-i) \quad (207)$$

where x(k−i): value observed in advance
$a_i$: prediction coefficient

Rewriting prediction equation (207) in accordance with the embodiment yields $$G'(n,n+1)=\Sigma a_i G(n-i,n-i+1) \quad (208)$$

Generally, the linear prediction method sets the prediction coefficient $a_i$ which minimizes an error |x(k)−x'(k)|. In the embodiment, $a_i=1$ for i=1 and $a_i=0$ for i≠1. Rewriting equation (208) yields $$G'(n,n+1)=G(n-1,n) \quad (209)$$

As represented by equation (209), G'(n,n+1) is calculated as the difference between the scanning position $P_n(n)$ of the scanning line n and the scanning position $P_n(n-1)$ of the scanning line n−1. Similarly, G'(n,n−1) is calculated as the difference between the scanning position $P_n(n-1)$ of the scanning line n−1 and the scanning position $P_n(n-2)$ of the scanning line n−2.

As the prediction coefficient $a_i$, a proper one of measured values acquired in advance can be selected. In accordance with the prediction coefficient $a_i$, the number of position information stored in the scanning line position table may be changed. Further, the embodiment is not limited to the linear prediction method, and another prediction method is also usable, including a method using a Kalman filter or a method using a simulator which simulates the motion of the image forming apparatus.

Thereafter, the scanning line interval calculation unit 2106 calculates the distance between dots according from equation (210) (step S2404):

$$D'\{(m,n),(m+j,n+i)\}=\sqrt{[(j\times Gx)^2+\{G'(n,n+1)\}^2]} \quad (210)$$

where (m,n): coordinates of the dot of interest
(m+j,n+i): coordinates of a neighboring dot $$i,j=\{-1,0,+1\}$$

Gx: distance when there is no position error between dots adjacent in the main scanning direction A halftone (HT) processing unit 2102 performs halftone processing for image data which has undergone image processes such as color matching, color separation, and gamma correction and is stored in an image data storage unit 2101, thereby generating printing image data (for example, binary image data). The binary image data generated by the HT processing unit 2102 is input to a control unit 201 of a printer engine 12. A dot pattern acquisition unit 2107 acquires a dot pattern dp around the dot (m,n) of interest from the binary image data generated by the HT processing unit 2102 (step S2405):

if {(m+j,n+i)=ON dot} dp(m+j,n+i)='1';

else dp(m+j,n+i)='0';           (211)

where ON dot: dot (non-white dot) which forms a color dot (m+j,n+i): coordinates of a neighboring dot i,j={−1,0,+1}

A correction rate calculation unit 2108 calculates a correction rate R, details of which will be described later (step S2406). An exposure amount correction unit 2109 corrects, at the correction rate R, an intensity E of the laser beam L that is held in an exposure amount holding unit 2103, and inputs a corrected intensity E' of the laser beam L to the control unit 201 of the printer engine 12 (step S2407):

E'=R·E           (212)

The processes in steps S2405 to S2407 are repeated for each pixel until it is determined in step S2408 that the pixel has reached the end of the scanning line n. Further, the processes in steps S2401 to S2408 are repeated for each scanning line until it is determined in step S2409 that the scanning line has reached the end of the image (processing for a scanning line at the end of the image has ended).

Calculation of Correction Rate R

The correction rate calculation unit 2108 calculates the correction rate R to reduce banding generated owing to a scanning line interval error. In other words, the correction rate R is set so that the following predicted densities $OD_{101}$ and $OD_{102}$ become equal to each other.

$OD_{101}$ is a predicted density on the current scanning line n upon exposure at the correct intensity E of the laser beam L in the absence of a scanning line interval error. $OD_{102}$ is a predicted density on the scanning line n upon exposure at the corrected intensity E' of the laser beam L in the presence of a scanning line interval error. $OD_{101}$ and $OD_{102}$ are predicted as follows from the interval between the dot of interest and the neighboring dot:

$OD_{101} = \Sigma dp(m+j,n+i) \times sh[\sqrt{\{(j \times Gx)^2 + (i \times Gy)^2\}}]$           (213)

$OD_{102} = (R-1) \times dp(m,n) \times sh(0) + \Sigma dp(m+j,n+i) \times sh[D'\{(m,n),(m+j,n+i)\}]$           (214)

where Gy: distance when there is no position error between dots adjacent in the sub-scanning direction sh( ): function indicating a density distribution when an isolated dot is printed at the correct intensity E of the laser beam L In other words, $OD_{101}$ is a density at the position of the dot of interest that is predicted using the distance between dots when the intervals between the scanning lines n−1, n, and n+1 are the reference scanning line interval (without any error), and a dot pattern around the dot (m,n) of interest. $OD_{102}$ is a density at the position of the dot of interest that is predicted using the distance between dots when there is an error, and a dot pattern.

The predicted density will be described with reference to the graphs of FIGS. 20A and 20B. For simplicity, FIGS. 20A and 20B show only the dot (m,n) of interest and the neighboring dot (m+1,n+1). Dots are printed to spread and overlap each other. Thus, the density at the position of interest is recognized as the sum of the densities of a dot corresponding to the position of interest and the neighboring dot at the position of interest.

FIG. 20A shows a change of the density when the dot position does not vary and the dot is exposed at the correct intensity E of the laser beam L. The density at the position of interest shown in FIG. 20A is equivalent to the sum of a density 2901 of the dot (m,n) of interest and a density 2902 of the neighboring dot (m+1,n+1). Since no dot position varies, the distance from the position of interest to the neighboring dot is given by $\sqrt{(Gx^2+Gy^2)}$, and the density 2902 of the neighboring dot at the position of interest is given by $sh\sqrt{(Gx^2+Gy^2)}$.

FIG. 20B shows a change of the density when the position of the dot of interest varies and the dot of interest is exposed at the corrected intensity E' of the laser beam L. A distance D' between the dot of interest and the neighboring dot is the distance calculated in step S2404. The density (sum of densities 2904 and 2903) at the position of interest shown in FIG. 20B depends on the interval D' between the dot of interest and the neighboring dot and differs from one in FIG. 20A. The first term of the right-hand side of equation (214) indicates the density when the intensity E of the laser beam L is corrected at the correction rate R. The summation Σ term indicates the density at the position of interest when the position varies.

The influence of a dot spaced apart from the position of interest on the density at the position of interest is sufficiently small and can be ignored. In the embodiment, dots (neighboring dots) adjacent to the position of interest (dot of interest) in the vertical, horizontal, and diagonal directions are subjected to density calculation.

Under the condition to make predicted densities match each other ($OD_{101}=OD_{102}$), the correction rate R is calculated from equation (215):

$R = 1 + 1/\{sh(0) \times dp(m,n)\} \times \Sigma dp(m+j,n+i) \times sh[\sqrt{\{(j \times Gx)^2 + (i \times Gy)^2\}}] - sh[D'\{(m,n),(m+j,n+i)\}]$           (215)

where dp(m+j,n+i): surrounding dot pattern calculated in step S2405

D'{(m,n),(m+j,n+i)}: dot interval calculated in step S2404

Order of Processes

The order of processes performed by the image forming apparatus will be explained with reference to the schematic view of FIG. 10. An area 1001 is an area capable of image formation, and an area 1002 is the area of an image to be formed.

The control unit 201 of the printer engine 12 supplies a laser signal 1004 to a laser element 411 shown in FIG. 18. The laser element 411 emits the laser beam L in accordance with the laser signal 1004. The laser beam L is deflected by a polygon mirror 412, and scans an area where a BD sensor 503 and the sensor 502 are arranged, and the area 1001.

The laser signal 1004 is divided into a signal portion 1007 for outputting a horizontal sync signal (a BD signal 1005) to the BD sensor 503, and an image portion 1008 for forming an image in the area 1002. The signal portion 1007 is active during at least a period 1009 during which the BD signal 1005 is output and the laser beam L scans the position of the sensor 502 (a laser position detection signal 1006 is output). The image portion 1008 becomes active a predetermined time 1010 after the BD signal 1005 is output.

A drum position detection signal 1011 of the encoder 501 is output at almost the same timing as that of the laser position detection signal 1006. After the laser position detection signal 1006 and drum position detection signal 1011 are output, the exposure amount correction unit 2109 outputs the corrected intensity E' of the laser beam L before the lapse of the predetermined time 1010. Then, the image portion 1008 becomes active.

In this way, the correction rate R of the intensity E of the laser beam L (in other words, the correction rate of the exposure amount) is calculated from the scanning line positions of the current scanning line n and neighboring scanning lines n−1 and n+1, and a dot pattern around the dot of interest. Then, the intensity E of the laser beam L is corrected (in other words, the exposure amount is corrected). The dot exposure amount can therefore be controlled in correspondence with variations of the image density depending on the dot density upon variations of the scanning line position. As a result, banding can be effectively reduced by suppressing density variations depending on the dot density. In addition, the density of an isolated point can be maintained.

[Modification]

In the third embodiment, the scanning line position table stores the scanning line positions of the scanning lines n, n−1, and n−2 using the current scanning line n as a reference. However, the scanning line position table may store the scanning line positions of the scanning lines n−1, n−2, and n−3 using the immediately preceding scanning line n−1 as a reference. Further, the number of scanning lines whose scanning line positions are stored in the scanning line position table is not limited to three. It suffices to store scanning line positions by the number of scanning lines necessary to predict the scanning line position.

In the above description, the isolated dot density distribution (function sh( ) is isotropic. However, when the density distribution is anisotropic (for example, the density distribution differs between the main scanning direction and the sub-scanning direction), a function indicating a two-dimensional distribution can be used as the function sh( ) to calculate a two-dimensional vector having a main scanning component and sub-scanning component as a dot interval D'.

In the above example, the dot of interest and neighboring dots are used to calculate the correction rate R. However, the present invention is not limited to this, and the dot range used to calculate the correction rate R may be expanded.

The correction rate R is calculated on the assumption that the density at the position of interest is proportional to the correction rate R. However, if this assumption does not hold, equivalent processing becomes possible using a lookup table (LUT), function, or the like indicating the relationship between the intensity E of the laser beam L and the dot density. In the above example, a predicted density at the position of interest is obtained from the sum of the densities of isolated dots. If this relationship does not hold, a predicted density or correction rate may be calculated using an LUT created in advance.

Equation (215) to calculate the correction rate R calculates the correction rate R on condition that the exposure amount of a neighboring dot has not been corrected. However, correction of the exposure amount of a neighboring dot can also be reflected in equation (215) by, for example, storing the correction rate R for every scanning.

In the above description, the HT processing unit 2102 generates binary image data. When the HT processing unit 2102 generates multi-level image data to perform multi-level exposure processing using pulse width modulation, exposure intensity modulation, or the like, the correction rate R is calculated using a function $sh_T()$ indicating a density distribution corresponding to the tone value T of the image data. Further, when the barycenter of a dot moves upon pulse width modulation, the moving amount of the barycenter can be reflected in equation (215).

Fourth Embodiment

Image processing according to the fourth embodiment of the present invention will be described. In the fourth embodiment, the same reference numerals as those in the third embodiment denote almost the same parts, and a detailed description thereof will not be repeated.

The third embodiment has assumed that the dot position varies only in the sub-scanning direction. The following fourth embodiment considers even variations (to be referred to as jitters) of the dot position in the main scanning direction caused by a shift of the write position of each scanning line. Note that the fourth embodiment will explain calculation (step S2404) of the distance between dots which is different from the third embodiment. The remaining arrangement and processing are the same as those in the third embodiment, and a description thereof will not be repeated.

Figure 21A:
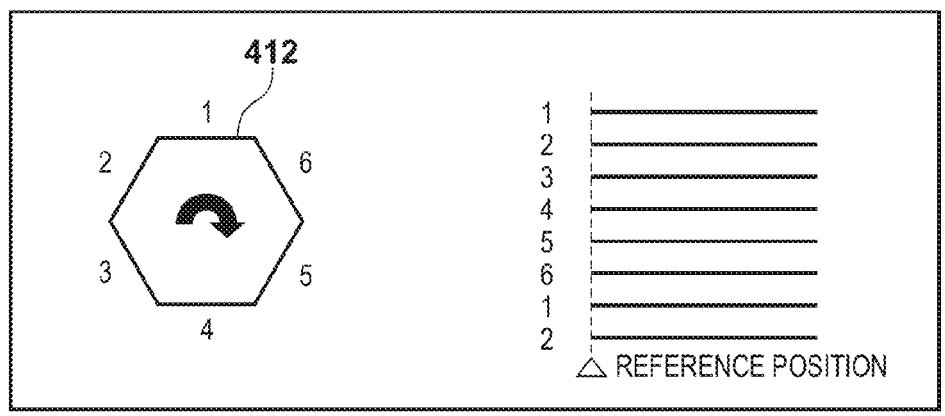
FIGS. 21A and 21B are views explaining the relationship between the polygon mirror precision and the scanning line position in the main scanning direction in the fourth embodiment.
Figure 21B:
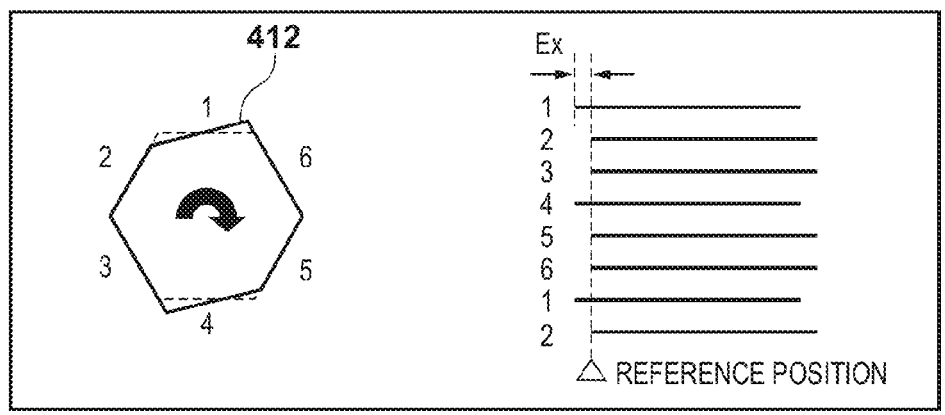

A jitter is generated depending on the precision of each surface of a polygon mirror 412 and the like. The relationship between the precision of the polygon mirror 412 and the scanning line position in the main scanning direction will be explained with reference to FIGS. 21A and 21B. FIG. 21A shows a case in which the surface of the polygon mirror 412 does not have an error. The write position of each scanning line is maintained at the reference position. FIG. 21B shows an example in which the first and fourth surfaces out of the six surfaces of the polygon mirror 412 have tilts (errors). If the polygon mirror 412 in this state is used, a write position shift Ex occurs on a scanning line scanned by the laser beam L reflected by each of the first and fourth surfaces.

A scanning line interval calculation unit 2106 holds, in a ROM or the like, the variation amount Ex(s) of each surface that has been acquired in advance by a device for acquiring the write position of a scanning line. The scanning line interval calculation unit 2106 calculates, according to equation (216), an interval D' between the dot (m,n) of interest and a neighboring dot (m+j,n+i) that contains variations in the main scanning direction (step S2404):

$$D'\{(m,n),(m+j,n+i)\}=\sqrt{[\{j \times Gx - Ex(n) + Ex(n+i)\}^2 + \{G'(n,n+1)\}^2]} \quad (216)$$

To make Ex(n) in equation (216) match Ex(s), it is controlled to, for example, scan scanning line 1 by the first surface. If scanning line 1 is scanned by the first surface, Ex becomes significant (nonzero) on scanning lines 1+6N and 4+6N (N=0, 1, 2, 3, . . . ) and becomes zero on the remaining scanning lines in the example of FIG. 21B.

By considering the jitter on each scanning line, a more accurate distance between dots can be calculated.

Fifth Embodiment

Apparatus Arrangement

The arrangement of an image forming apparatus (an image processing apparatus) according to the fifth embodiment will be exemplified with reference to FIG. 22. Of the building elements of the image forming apparatus in the fifth embodiment, a description of the same building elements as those shown in FIG. 1 in the first embodiment will not be repeated. As described above, control (to be referred to as exposure amount control) of the intensity (or emission time) of a laser beam L needs to consider not only information of the current scanning line but also information of neighboring scanning lines.

[Exposure Amount Control]

Figure 23:
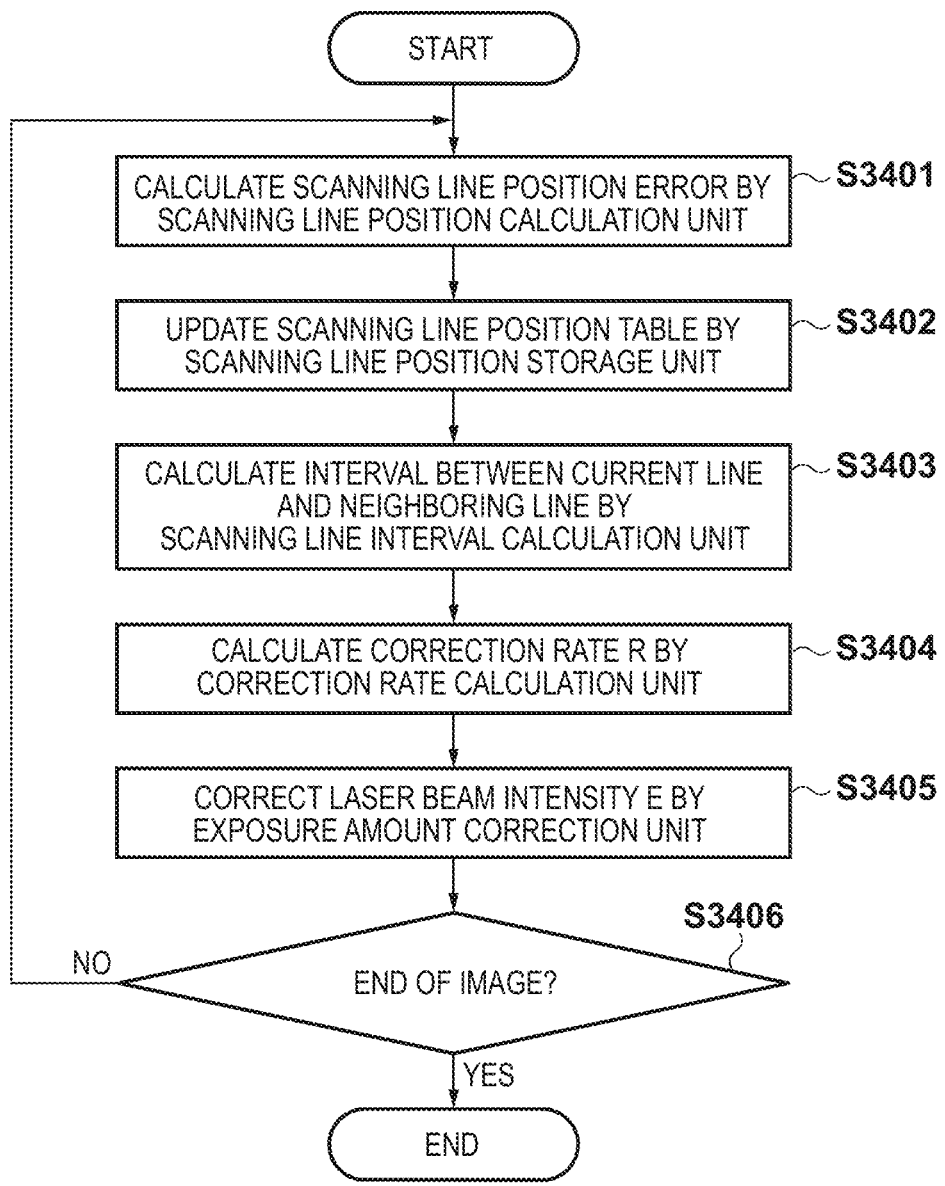
FIG. 23 is a flowchart explaining exposure amount control in the fifth embodiment.

Exposure amount control will be described with reference to the flowchart of FIG. 23. Note that processing shown in FIG. 23 is executed in every scanning of the laser beam and repeated by the number of pixels (number of lines) of one image in the sub-scanning direction. An arrangement which performs exposure amount control will be exemplified with reference to the block diagram of FIG. 24.

A scanning line position calculation unit 3104 in a printer controller 11 calculates a scanning line position error on a scanning line n, and outputs the error to a scanning line position storage unit 3105 (step S3401).

First, the scanning line position calculation unit 3104 acquires the rotation angle θ' of a photosensitive drum 401 by integrating pulse signals corresponding to rotation of the photosensitive drum 401 that are generated by an encoder 501. Then, the scanning line position calculation unit 3104 calculates a scanning line position Da(n) from the rotation angle θ' in accordance with equation (302):

$$Da(n)=r\cdot\theta' \quad (302)$$

Further, the scanning line position calculation unit 3104 calculates, in accordance with equation (303), a difference Dx(n) between an error-free scanning line position Db(n) calculated from equations (1) and (2) and the scanning line position Da(n):

$$Dx(n)=Db(n)-Da(n) \quad (303)$$

Then, the scanning line position calculation unit 3104 acquires an irradiated position shift Lx(n) of the laser beam L from a sensor 502. The operation of the sensor 502 will be explained with reference to the schematic view of FIG. 6. The sensor 502 is formed by covering a light-receiving element with a triangular slit 601. The sensor 502 outputs a pulse signal of a width corresponding to the detection period of the laser beam L. When the irradiated position of the laser beam L scanned at a constant speed changes, the width of the pulse signal changes depending on the position. Hence, the irradiated position shift Lx(n) can be calculated from the width of the pulse signal. As shown in FIG. 6, when the laser beam L irradiates a reference irradiated position 603, the width of the pulse signal output from the sensor 502 is w1. If the laser beam L shifts by Lx(n) to an irradiated position 604, the width of the pulse signal output from the sensor 502 becomes w2.

From a change of the width of the pulse output from the sensor 502, the irradiated position shift Lx(n) of the laser beam L can be calculated. The slit 601 is shaped into a right-angled triangle, and a side adjacent to the right angle is set parallel to the laser scanning direction. In this case, the irradiated position shift Lx(n) is obtained by multiplying the difference between the pulse width w2 and the reference pulse width w1 by a proportional coefficient. The proportional coefficient is determined by the slope of the hypotenuse of the right-angled triangle. The proportional coefficient is 1 for a slope of 45°, and a distance equivalent to the pulse width difference serves as the irradiated position shift Lx(n). The scanning line position error Px(n) is given by $$Px(n)=Dx(n)+Lx(n) \quad (304)$$

Upon receiving the scanning line position error Px(n) of the scanning line n, the scanning line position storage unit 3105 sequentially updates the stored scanning line position table (step S3402).

Figures 25A, 25B, 26:
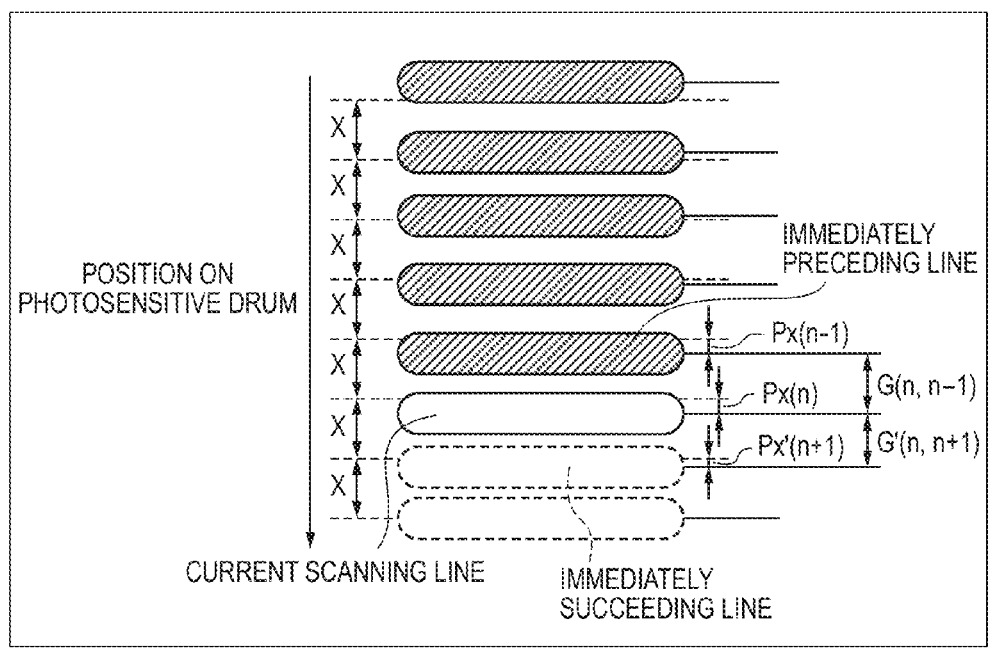
FIGS. 25A and 25B are tables explaining a scanning line position table in the fifth embodiment.
FIG. 26 is a schematic view explaining processing of calculating a scanning line interval in the fifth embodiment.

The scanning line position table will be explained with reference to FIGS. 25A and 25B. As shown in FIG. 25A, the scanning line position table stores a position error Px(n) of each scanning line preceding the current scanning line using a correct scanning line position as a reference. Every time n is incremented, these pieces of information are updated to the latest ones according to equation (305):

$$Px(n-m)=Px'(n-m+1);$$

$$\ldots$$

$$Px(n-2)=Px'(n-1);$$

$$Px(n-1)=Px'(n);$$

$$Px(n)=Px(n); \quad (305)$$

where Px': error obtained by previous processing
Px: error obtained by current processing
m+1: the number of stored scanning line position error information (for example, 201)

Before the start of printing one image, an error stored in the scanning line position table is initialized to 0, as shown in FIG. 25B. This is because scanning line position information at the start of printing is not continuous from that in previous printing. Note that the embodiment will explain an example of setting a scanning position error of 0 as an initial value. However, the laser beam L may be scanned outside the image forming area to acquire scanning line position information and set an actual error as an initial value.

A scanning line interval calculation unit 3106 calculates the intervals between the current scanning line n (current line) and neighboring scanning lines (neighboring lines) by looking up the updated scanning line position table (step S3403). That is, the scanning line interval calculation unit 3106 calculates an interval G(n,n−1) between the current scanning line n (current line) and a preceding scanning line n−1 (preceding line), and an interval G(n,n+1) between the current line n and a succeeding scanning line n+1 (succeeding line).

Processing of calculating the interval between scanning lines will be explained with reference to the schematic view of FIG. 26. A broken line in FIG. 26 indicates the scanning line position of a reference scanning line interval X that is determined from the printer resolution. A solid line corresponds to an actual scanning line position. Since the error Px(n) of the current line and the error Px(n−1) of the preceding line are known, the interval G(n,n−1) is calculated from equation (306):

$$G(n,n-1)=X+Px(n)-Px(n-1) \quad (306)$$

To the contrary, Px(n+1) has not been acquired yet in scanning of the current line n, so the interval G(n,n+1) cannot be simply calculated. For this reason, an estimated value G'(n,n+1) of the interval is calculated by linear prediction (equations (307)) using the known scanning line error Px(n−i):

$$G'(n,n+1)=X+Px'(n+1)-Px(n)$$

$$Px'(n+1)=\Sigma a_i Px(n-i) \quad (307)$$

where Px'(n+1): estimated value of the error of the succeeding line n+1
$a_i$: prediction coefficient (for example, i=0 to 4)

The linear prediction method predicts a future value by linear mapping of a value observed in advance. The linear prediction method is generally given by a predicted value x'(k)

$$x'(k)=\Sigma a_i x(k-i) \quad (308)$$

where x(k−i): value observed in advance
$a_i$: prediction coefficient

The relationship between the prediction coefficient $a_i$ and the estimated value Px' will be described later. The above example adopts the linear prediction method. However, another prediction method is also available, including a method using a Kalman filter or a method using a simulator which simulates the motion of the image forming apparatus.

A correction rate calculation unit 3107 calculates a correction rate R, details of which will be described later (step S3404). An exposure amount correction unit 3108 corrects, at the correction rate R, an intensity E of the laser beam L that is held in an exposure amount holding unit 3103, and inputs a corrected intensity E' of the laser beam L to a control unit 201 of a printer engine 12 (step S3405):

$$E' = R \cdot E \tag{309}$$

The processes in steps S3401 to S3405 are repeated until it is determined in step S3406 that the scanning line has reached the end of the image.

A halftone (HT) processing unit 3102 performs halftone processing for image data which has undergone image processes such as color matching, color separation, and gamma correction and is stored in an image data storage unit 3101, thereby generating printing image data (for example, binary image data). The binary image data generated by the HT processing unit 3102 is input to the control unit 201 of the printer engine 12.

Calculation of Correction Rate R

The correction rate calculation unit 3107 calculates the correction rate R to reduce banding generated owing to a scanning line interval error. In other words, the correction rate R is set so that the following predicted densities $OD_{101}$ and $OD_{102}$ become equal to each other.

$OD_{101}$ is a predicted density on the current scanning line n upon exposure at the correct intensity E of the laser beam L in the absence of a scanning line interval error. $OD_{102}$ is a predicted density on the scanning line n upon exposure at the corrected intensity E' of the laser beam L in the presence of a scanning line interval error. $OD_{101}$ and $OD_{102}$ are predicted as follows from the intervals G(n,n−1) and G'(n,n+1):

$$OD_{101} = sh(0) + \Sigma_i sh(iX) \tag{310}$$

$$OD_{102} = R \times sh(0) + \Sigma_i sh\{G(n,n+1)\} \tag{311}$$

where sh( ): function indicating a density distribution when an isolated dot is printed at the correct intensity E of the laser beam L X: reference scanning line interval The range of i is {−1,1}.

Figure 27A:
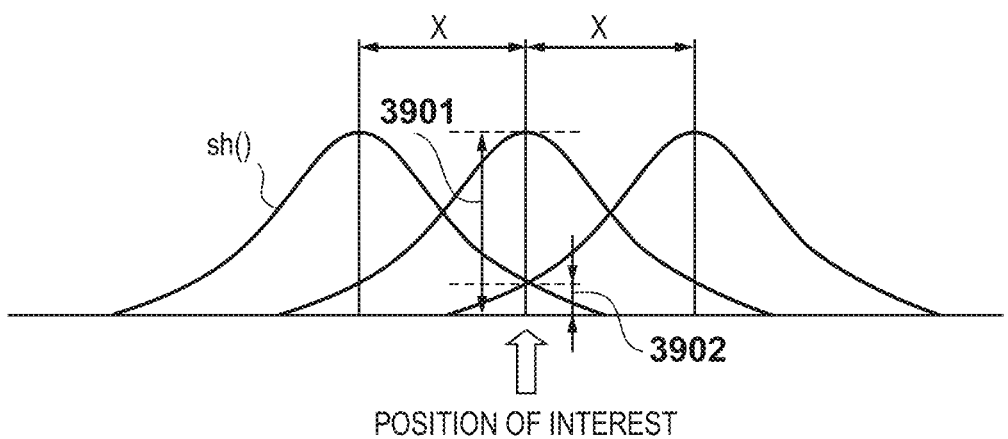
FIGS. 27A and 27B are graphs explaining a predicted density in the fifth embodiment.
Figure 27B:
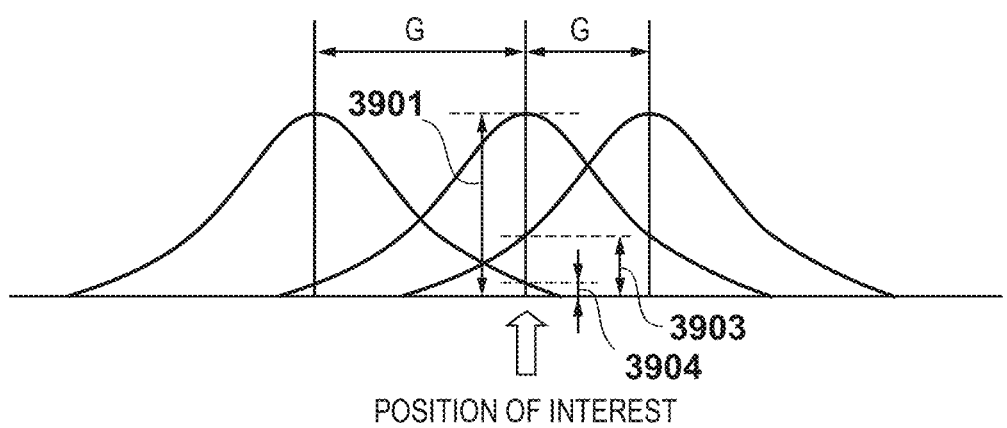

The predicted density will be described with reference to the graphs of FIGS. 27A and 27B. For simplicity, FIGS. 27A and 27B show an example in which only dots of three adjacent lines are formed. Dots are printed to spread and overlap each other. The density at the position of interest is recognized as the sum of the densities of a dot corresponding to the position of interest and the neighboring dot at the position of interest.

FIG. 27A shows a change of the density when the scanning line position does not vary and the dot is exposed at the correct intensity E of the laser beam L. The density at the position of interest shown in FIG. 27A is equivalent to the sum of a density 3901 of a dot on the line of interest and the densities (both of them are a density 3902) of dots on adjacent lines. The first term of the right-hand side of equation (310) corresponds to the density 3901 at the position of interest shown in FIG. 27A. The second term corresponds to the sum of the densities 3902 at the position of interest shown in FIG. 27A.

FIG. 27B shows a change of the density when the scanning line position varies and the scanning line at the position of interest is exposed at the corrected intensity E' of the laser beam L. The densities of adjacent lines have different values, like densities 3903 and 3904. The first term of the right-hand side of equation (311) corresponds to the density 3901 at the position of interest upon exposure at the corrected intensity E' of the laser beam L shown in FIG. 27B. The second term corresponds to the sum of the densities 3903 and 3904 at the position of interest shown in FIG. 27B.

Note that the density of a dot on a neighboring scanning line affects the density at the position of interest. Strictly speaking, the influence of the densities of dots on all the scanning lines of an image needs to be considered. However, the influence of a dot on a scanning line spaced apart from the position of interest is sufficiently small and can be ignored. From this, the embodiment considers the influence of the densities of only dots on scanning lines preceding and succeeding the position of interest (current line).

Under the condition to make predicted densities match each other ($OD_{101} = OD_{102}$), the correction rate R is calculated from equation (312):

$$R = 1 + 1/sh(0) \times \Sigma_i [sh(iX) - sh\{G(n,n+i)\}] \tag{312}$$

In this equation, G(n,n−1) and G(n,n+1) calculated by the scanning line interval calculation unit 3106 are substituted into G(n,n+1).

Order of Processes

The order of processes performed by the image forming apparatus will be explained with reference to the schematic view of FIG. 10. An area 1001 is an area capable of image formation, and an area 1002 is the area of an image to be formed.

Figure 24:
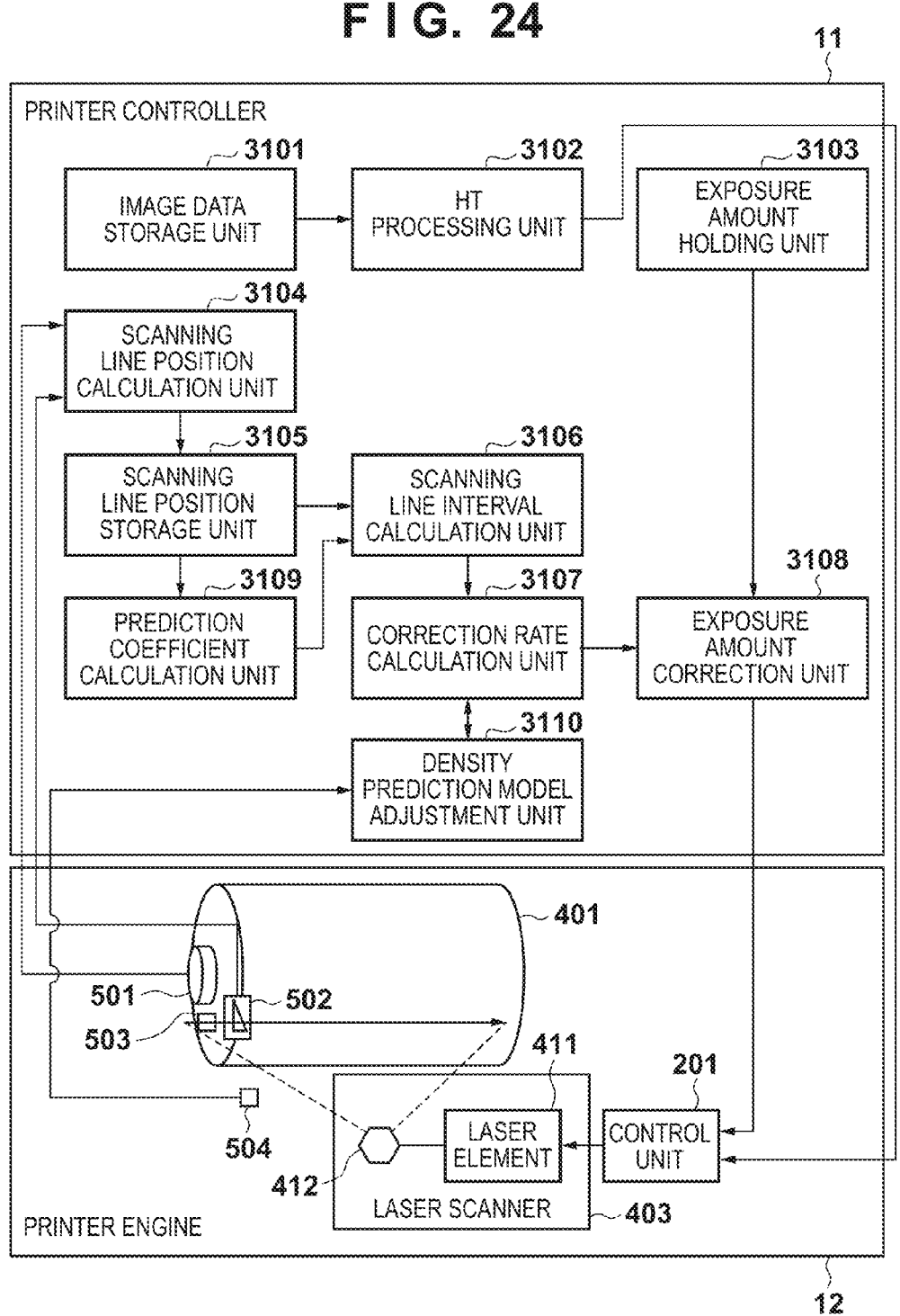
FIG. 24 is a block diagram explaining an example of an arrangement which performs exposure amount control in the fifth embodiment.

The control unit 201 of the printer engine 12 supplies a laser signal 1004 to a laser element 411 shown in FIG. 24. The laser element 411 emits the laser beam L in accordance with the laser signal 1004. The laser beam L is deflected by a polygon mirror 412, and scans an area where a BD sensor 503 and the sensor 502 are arranged, and the area 1001.

The laser signal 1004 is divided into a signal portion 1007 for outputting a horizontal sync signal (a BD signal 1005) to the BD sensor 503, and an image portion 1008 for forming an image in the area 1002. The signal portion 1007 is active during at least a period 1009 during which the BD signal 1005 is output and the laser beam L scans the position of the sensor 502 (a laser position detection signal 1006 is output). The image portion 1008 becomes active a predetermined time 1010 after the BD signal 1005 is output.

A drum position detection signal 1011 of the encoder 501 is output at almost the same timing as that of the laser position detection signal 1006. After the laser position detection signal 1006 and drum position detection signal 1011 are output, the exposure amount correction unit 3108 outputs the corrected intensity E' of the laser beam L before the lapse of the predetermined time 1010. Then, the image portion 1008 becomes active.

In this fashion, the correction rate R of the intensity E of the laser beam L (in other words, the correction rate of the exposure amount) is calculated from scanning position error information of the current line n and neighboring lines n−1 and n+1. Then, the intensity E of the laser beam L is corrected (in other words, the exposure amount is corrected). The scanning line exposure amount can therefore be controlled in correspondence with variations of the image density depending on the scanning line density upon variations of the scanning line position. Accordingly, banding can be effectively reduced by suppressing density variations depending on the scanning line density.

[Calibration of Prediction]

In the above exposure amount control, the error Px' at the position of a succeeding line is predicted, the density $OD_{102}$ on the current line is predicted on the premise that the scanning line interval has an error, and the correction rate R of the exposure amount E is calculated based on these predictions. If these predictions have a large error, the exposure amount E cannot be corrected appropriately. Hence, the predictions are calibrated. Note that calibration is executed at a predetermined timing, for example, immediately after the image forming apparatus shown in FIG. 22 is turned on, after a predetermined number of images are formed, or when the user designates calibration.

A density sensor 504 shown in FIGS. 22 and 24, and a prediction coefficient calculation unit 3109 and density prediction model adjustment unit 3110 shown in FIG. 24 exemplify an arrangement for executing calibration. Calibration will be explained with reference to the flowchart of FIG. 28.

The prediction coefficient calculation unit 3109 reads the latest error information from the scanning line position table of the scanning line position storage unit 3105 (step S3411). When information stored in the scanning line position table does not reflect the current state of the image forming apparatus, for example, immediately after power-on, the latest error information is acquired by, for example, exposing and developing a test image on the photosensitive drum 401.

Then, the prediction coefficient calculation unit 3109 outputs, to the scanning line interval calculation unit 3106, a prediction coefficient $\underline{a}$ (prediction parameter) calculated from the error information (step S3412). The scanning line interval calculation unit 3106 holds the received prediction coefficient $\underline{a}$ and calculates the scanning line interval G using the prediction coefficient $\underline{a}$.

Figure 29A:
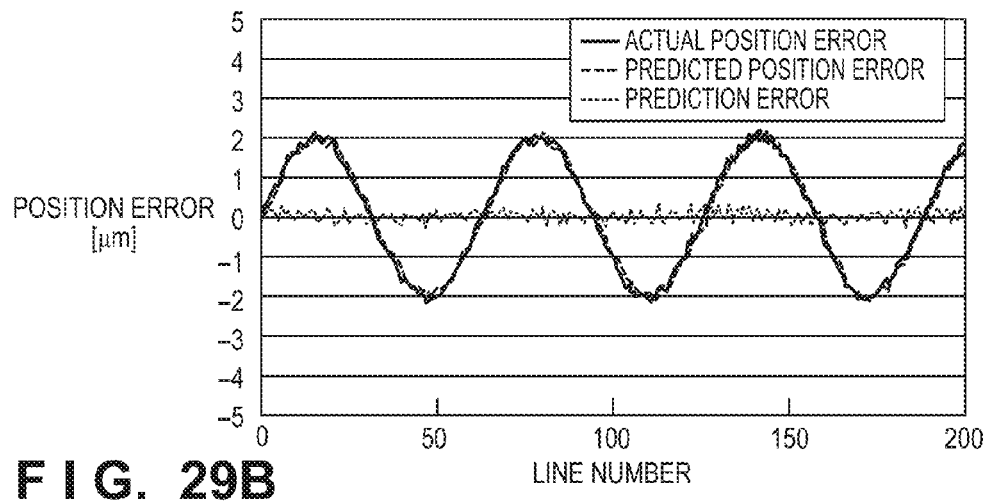
FIGS. 29A to 29C are graphs explaining a scanning line position error in the fifth embodiment.

The scanning line position error will be explained with reference to FIGS. 29A to 29C. FIG. 29A exemplifies the position errors of 200 scanning lines which are acquired from the scanning line position table. A sinusoidal position error variation with an amplitude of 2 μm in a cycle of about 63 scanning lines and small noise are generated. The prediction coefficient $\underline{a}$ which minimizes the prediction error of the position error sequence shown in FIG. 29A can be given by $$Xa = b$$
$$X \backslash Xa = X \backslash Xb$$
$$a = X \backslash b$$

where $$X = \begin{bmatrix} Px(n-m) & 0 & \cdots & 0 \\ \vdots & Px(n-m) & \cdots & \vdots \\ Px(n-1) & \vdots & \cdots & 0 \\ P(x) & Px(n-1) & \cdots & Px(n-m) \\ 0 & P(x) & \cdots & \vdots \\ \vdots & \vdots & \cdots & Px(n-1) \\ 0 & \cdots & 0 & P(x) \end{bmatrix}$$

$$a = \begin{bmatrix} 1 \\ -a0 \\ -a1 \\ -a2 \\ -a3 \\ -a4 \end{bmatrix}$$

$$b = \begin{bmatrix} 1 \\ 0 \\ \vdots \\ 0 \end{bmatrix}$$

where the operation symbol "\" is left division.

In equations (313), X is a matrix having rows by (the number of error information stored in the scanning line position table)+(the number of prediction coefficients), and columns by (the number of prediction coefficients)+(one column). The number of error information is m+1, and the number of prediction coefficients is five. The first column is the right answer of a position error sequence predicted by the coefficient, and the second and subsequent columns are position error sequences for predicting the first column.

$\underline{a}$ is a matrix having rows by (the number of prediction coefficients)+(one row) and one column. This matrix has "1" on the first row and prediction coefficients $\underline{a}$ on the subsequent rows.

Regarding an arbitrary row of X, Xa is equivalent to equation (314), and represents a prediction error when Px(n) is predicted from Px(n−1), . . . , Px(n−5) using the prediction coefficient $\underline{a}$:

$$Xa=Px(n)-a0 \cdot Px(n-1)-a1 \cdot Px(n-2)-a2 \cdot Px(n-3)-a3 \cdot Px(n-4)-a4 \cdot Px(n-5) \quad (314)$$

b is a matrix having rows by (the number of error information)+(the number of prediction coefficients) and one column, and represents the target value of the prediction error. This matrix has "1" on the first row and a prediction error target value of 0 on the subsequent rows. Xa corresponding to the first row sends back only the first error information stored in the scanning line position table without performing prediction, so a constant "1" is set in the first row.

The operation symbol "\" in equations (313) is known as left division. When X is a square matrix, X\ is an inverse matrix. That is, X\X is a unit matrix, and the prediction coefficient $\underline{a}$ can be calculated from equations (313). Equations (313) are generally known as the least squares method. The coefficient $\underline{a}$ calculated from equations (313) minimizes a prediction error when the next point is predicted from five successive points of a position error sequence. FIG. 29A shows a position error predicted from the prediction coefficient $\underline{a}$ calculated from equations (313), and a prediction error.

The image forming apparatus sometimes changes the position error variation cycle due to deterioration of a building component, a change over time, or the like. FIG. 29B shows a position error sequence in which an error with an amplitude of 2 μm in a cycle of 16 scanning lines is superposed along with a change of the image forming apparatus over time in addition to the position error variation in a cycle of about 63 scanning lines shown in FIG. 29A. FIG. 29B also shows a position error predicted using the prediction coefficient $\underline{a}$ obtained from the position error sequence shown in FIG. 29A, and a prediction error. Since the prediction coefficient $\underline{a}$ does not fit the image forming apparatus after a change of the state, a prediction error with an amplitude of about 1 µm in a cycle of 16 scanning lines is generated.

Figure 29B:
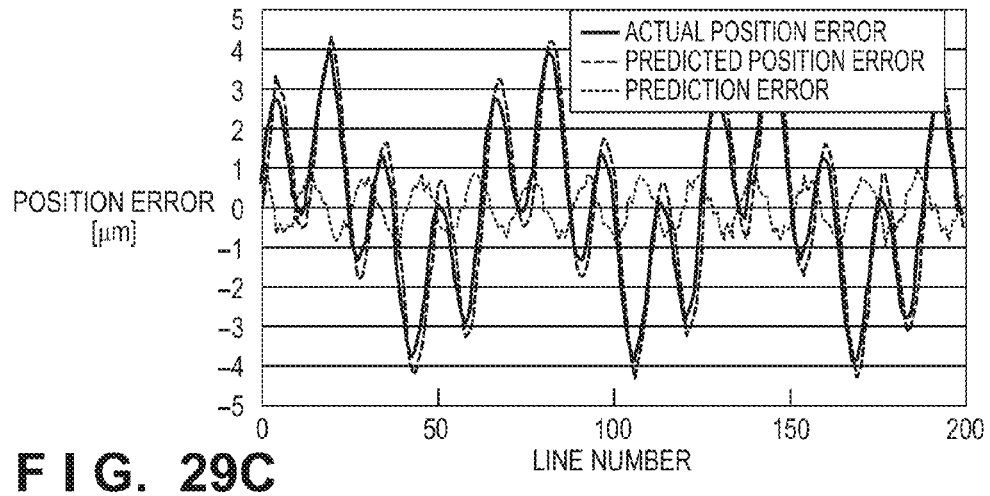
Figure 29C:
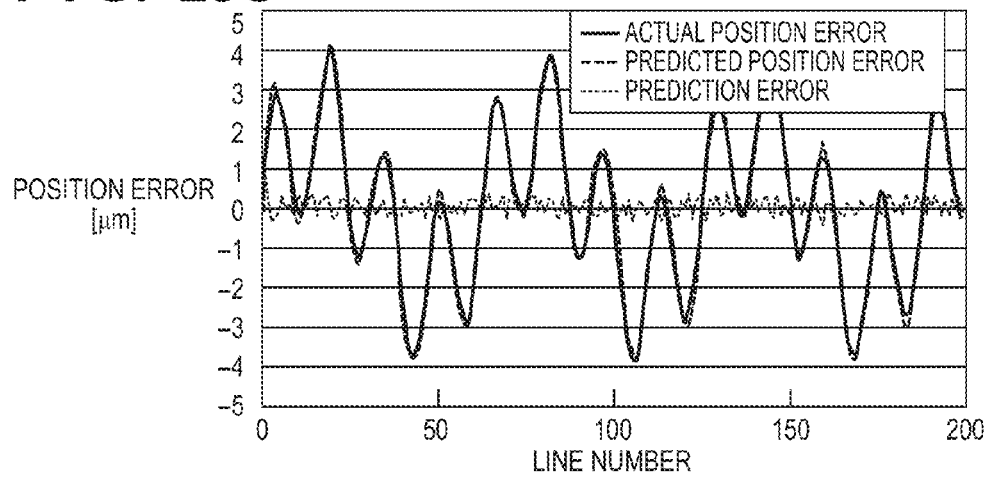

FIG. 29C is a graph showing a position error predicted using the prediction coefficient a calculated for the position error sequence shown in FIG. 29B, and a prediction error. As shown in FIG. 29C, the prediction error can be reduced using the newly calculated prediction coefficient a.

More specifically, in step S3412, the prediction coefficient calculation unit 3109 sets the prediction coefficient a using the latest error information. This allows predicting a position error which matches the current state of the image forming apparatus.

After that, the density prediction model adjustment unit 3110 exposes and develops a patch on the photosensitive drum to detect density variations (step S3413). The patch is an image pattern of a predetermined size at an area ratio of 100%. When forming this patch, the exposure amount E is not corrected.

The correction rate calculation unit 3107 outputs, to the density prediction model adjustment unit 3110, the patch density $OD_{102}$ predicted from equations (311) based on the scanning line position in patch formation (step S3414). Since the exposure amount E is not corrected in patch formation, the patch density $OD_{102}$ is predicted using the correction rate R=1 in equations (311). At the same time as the processing by the correction rate calculation unit 3107, the density prediction model adjustment unit 3110 acquires a patch density $OD_{real}$ from the density sensor 504 (step S3415). The density prediction model adjustment unit 3110 calculates the function sh( ) indicating the dot density distribution based on the predicted patch density $OD_{102}$ and the acquired actual patch density $OD_{real}$ (measurement result) (step S3416).

Figure 30A:
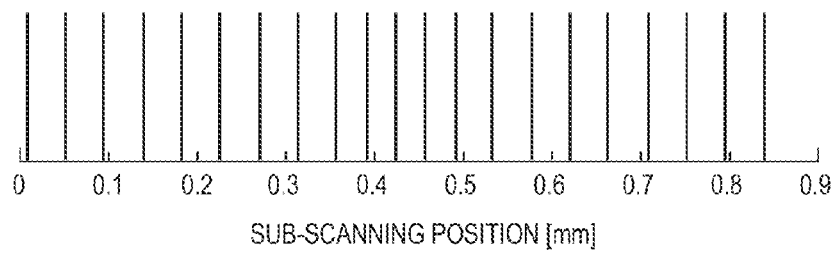
FIGS. 30A to 30C are views explaining calculation of a prediction function sh( ) in the fifth embodiment.
Figure 30B:
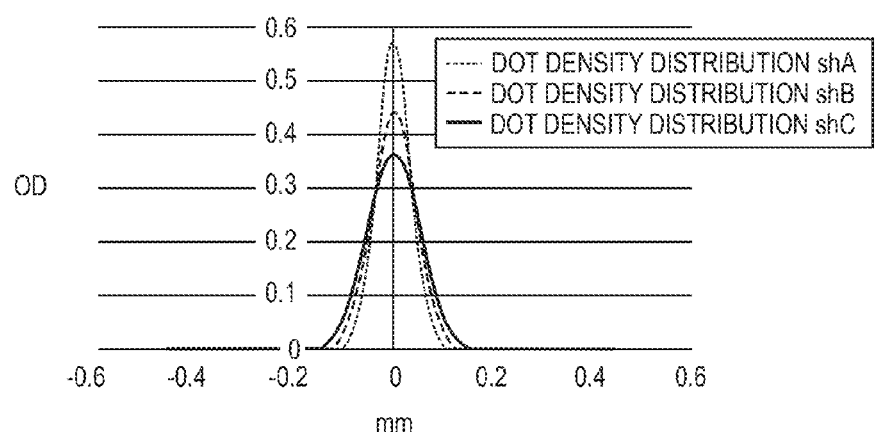
Figure 30C:
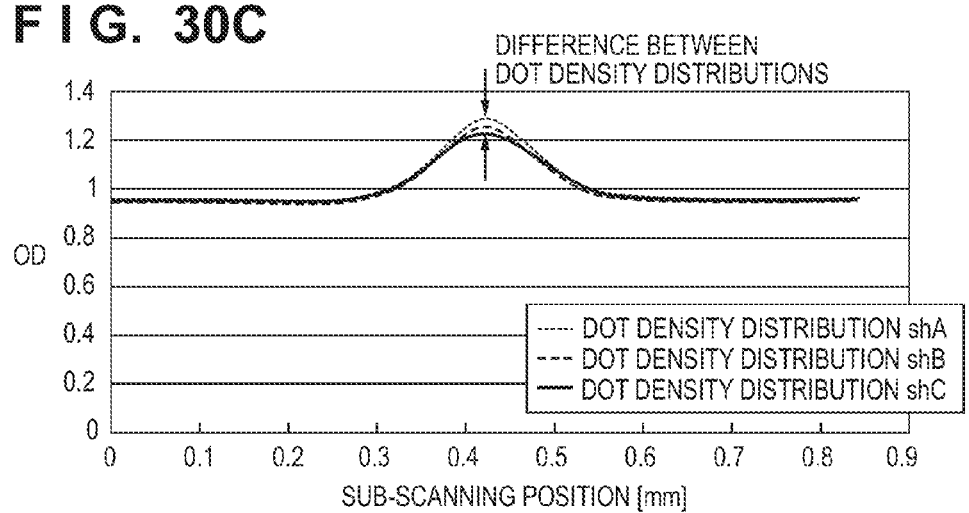

Calculation of the prediction function sh( ) will be explained with reference to FIGS. 30A to 30C. FIG. 30A exemplifies a scanning line position when the density $OD_{102}$ is predicted. FIG. 30B shows the function sh( ) used in density prediction. FIG. 30C shows the density $OD_{102}$ predicted from the convolution integral of FIGS. 30A and 30B. Note that the predicted density is equivalent to one calculated from equations (311). FIG. 30B shows the density distributions (functions) sh of three dots having different dot sizes. However, areas defined by these density distribution curves are equal. The function sh( ) is given by $$sh(x) = \{1/\sqrt{(2\pi)}\sigma\} \cdot \exp\{-x^2/(2\sigma^2)\} \quad (315)$$

Equation (315) is known as a normal distribution. σ is the standard deviation and corresponds to the width of the dot density distribution. In the embodiment, the total dot density is normalized by rounding 0.001 or less to 0 in order to make the dot density distribution finite. The density distributions of three dots shown in FIG. 30B have different standard deviations σ. Three patch densities shown in FIG. 30C correspond to the dot density distributions shown in FIG. 30B, respectively.

As for the scanning line position shown in FIG. 30A, the scanning line interval becomes narrow around a distance of 0.4 mm from the upper end (0 mm) of the patch, and the scanning line density increases. As for the predicted density of the patch, the patch density distributions are almost equal at a portion having low scanning line density regardless of the function sh( ) for use. However, at a portion where the scanning line density changes, the predicted density of the patch changes depending on the difference of the function sh( ) as shown in FIG. 30C. From this, in step S3416, the density prediction model adjustment unit 3110 estimates the shift amount Δσ of σ of the function sh( ) in accordance with equation (316) using the difference between the actual patch density distribution $OD_{real}$ and the predicted patch density $OD_{102}$:

$$\Delta\sigma = k_{sh} \cdot k\Sigma |OD_{real} - OD_{102}| \quad (316)$$

where $k_{sh}$: coefficient indicating the relationship between the prediction error of a preset patch density and σ

The density prediction model adjustment unit 3110 updates the standard deviation σ of the function sh( ) in accordance with equation (317):

$$\sigma = \sigma' - \Delta\sigma \quad (317)$$

where σ': standard deviation used to calculate the previous function sh( )

The density prediction model adjustment unit 3110 outputs, to the correction rate calculation unit 3107, the function sh( ) calculated from equation (316) using σ updated based on equation (317). The correction rate calculation unit 3107 holds the received function sh( ), and uses the held function sh( ) in subsequent processing. This calibration can set the appropriate correction rate R of the exposure amount E against deterioration of a building component of the image forming apparatus, a change over time, and a change of the dot density distribution depending on the image forming condition and the like.

In this above manner, proper prediction becomes possible by performing calibration to correct the prediction error of the position error Px' of a subsequent line or the prediction error of the density $OD_{102}$ when calculating the correction rate R of the exposure amount E using position error information of the current line and neighboring lines. Hence, high-precision banding correction can be achieved.

[Modification]

In the above example, the scanning line position table in the scanning line position storage unit 3105 stores the position error of each scanning line in the sub-scanning direction. However, the scanning line position table may store relative position information of the current scanning line using the reference position as a reference, the interval between adjacent scanning lines, or the like.

In the above example, calculation (step S3404) of the correction rate R uses two scanning line intervals between the current line, and preceding and succeeding scanning lines. However, scanning line intervals from many neighboring lines may be used. In calculation of the correction rate R, the dot density is calculated on the premise that it is proportional to the exposure amount E and correction rate R. However, if this proportional relationship does not hold, equivalent processing can be done using a lookup table (LUT) or function indicating the relationship between the exposure amount and the dot density. In the above example, a predicted density at the scanning line position is obtained from the sum of isolated dots. If this is impossible, a predicted density or correction rate R may be calculated using an LUT created in advance. Equation (312) calculates the correction rate R regardless of the correction rate R of the exposure amount E of a neighboring line. However, the correction amount R can also be stored in every scanning and reflected in calculation of the correction rate R.

Prediction (step S3403) of the scanning line position uses linear prediction, and the prediction coefficient is calculated in calculation (step S3412) of the prediction coefficient. However, the same effects as the above ones can be obtained by predicting a scanning line position using a transfer function, state equation, or the like known in the field of control engineering, and using a corresponding observer.

Calculation (step S3416) of the dot density distribution uses a normal distribution. However, the same effects as the above ones can be obtained by even a method using an LUT representing an actually measured dot density distribution, a method of changing the half-width of a predetermined dot density distribution, or the like.

In the flowchart shown in FIG. 28, calculation (steps S3411 and S3412) of the prediction coefficient and calculation (steps S3413 to S3416) of the dot density distribution are executed successively. However, they may be performed independently at separate timings.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-246744, filed on Nov. 2, 2010, 2010-247836, filed on Nov. 4, 2010 and 2010-247839, filed on Nov. 4, 2010 which are hereby incorporated by reference herein in their entirety.

The invention claimed is:

1. An image processing apparatus which controls an exposure amount in forming an electrostatic latent image on an image carrier by scanning and exposing the image carrier in a main scanning direction using an exposure unit, which image carrier moves in a sub-scanning direction perpendicular to the main-scanning direction, comprising:
   an obtaining unit configured to obtain position information indicating a scanning position in the sub-scanning direction on the image carrier;
   an interval calculation unit configured to calculate a first scanning line interval and a second scanning line interval, by using position information about a scanning line of interest to be scanned and position information about a scanned scanning line which has already been scanned, wherein the first scanning line interval indicates a distance in the sub-scanning direction between the scanning line of interest and a succeeding scanning line to be scanned after the scanning line of interest, and wherein the second scanning line interval indicates a distance in the sub-scanning direction between the scanning line of interest and the scanned scanning line;
   a density calculation unit configured to calculate a predicted density in the scanning line of interest using the first scanning line interval and the second scanning line interval;
   a rate calculation unit configured to calculate a correction rate on an exposure amount for the scanning line of interest so that the predicted density matches with a reference density calculated using a predetermined reference scanning line interval; and
   a correction unit configured to correct the exposure amount for the scanning line of interest by multiplying the exposure amount by the correction rate.

2. The apparatus according to claim 1, wherein
said interval calculation unit is further configured to calculate, as the first scanning line interval, a distance between the scanning line of interest and the succeeding scanning line adjacent to the scanning line of interest, and
said interval calculation unit is further configured to calculate, as the second scanning line interval, a distance between the scanning line of interest and the scanned scanning line adjacent to the scanning line of interest.

3. The apparatus according to claim 1, wherein the position information about the scanning line of interest shows a relative position of the scanning line of interest from a theoretical reference position on the image carrier.

4. The apparatus according to claim 1, wherein the obtaining unit is further configured to hold the obtained position information, and to obtain the position information about the scanned scanning line based on the reference scanning line interval and the position information which has already been obtained.

5. The apparatus according to claim 1, wherein said interval calculation unit is further configured to calculate the second scanning line interval by prediction using the position information about the scanned scanning line which has been obtained by said obtaining unit.

6. An image processing apparatus which controls an exposure amount in forming a plurality of scanning lines at an interval of a predetermined number of scanning lines by one scanning on an image carrier moving in a sub-scanning direction, which scanning is performed by an exposure unit which is configured to scan and expose in a main scanning direction perpendicular to the sub-scanning direction, comprising:
   a detection unit configured to obtain position information indicating a scanning position of each of the plurality of scanning lines in the sub-scanning direction on the image carrier;
   an interval calculation unit configured to calculate a first scanning line interval and a second scanning line interval, by using position information about a scanning line of interest to be scanned and position information about a scanned scanning line which has already been scanned, wherein the first scanning line interval and the second scanning line interval indicate distances in the sub-scanning direction between the scanning line of interest and scanning lines which sandwich the scanning line of interest;
   a density calculation unit configured to calculate a predicted density in the scanning line of interest using the first scanning line interval and the second scanning line interval;
   a rate calculation unit configured to calculate a correction rate on an exposure amount for the scanning line of interest so that a predicted density matches with a reference density calculated using a predetermined reference scanning line interval; and
   a correction unit configured to correct the exposure amount for the scanning line of interest by multiplying the exposure amount by the correction rate.

7. An image processing apparatus comprising:
   an error calculation unit configured to calculate an error of a scanning line position on an image carrier in a sub-scanning direction, for a current line;

an update unit configured to update, by using the calculated error, information indicating scanning line positions of a current line and a line preceding the current line;
a distance calculation unit configured to calculate a distance between a dot of interest on the current line and a dot near the dot of interest by using the updated information indicating scanning line positions;
an acquisition unit configured to acquire a dot pattern around the dot of interest; and
a control unit configured to control an exposure amount of the dot of interest based on the calculated distance and the dot pattern.

8. The apparatus according to claim 7, wherein said update unit is configured to include a table which stores information indicating scanning line positions of the current line, the line preceding the current line, and a second preceding line preceding the current line, and
said update unit is further configured to update, when the error is calculated, the information of the scanning line position of the second preceding line using the scanning line position of the preceding line and a reference scanning line interval; update the information of the scanning line position of the preceding line using the scanning line position of the current line and the reference scanning line interval; and update the information of the scanning line position of the current line using the error.

9. The apparatus according to claim 8, wherein said distance calculation unit is further configured to predict a distance between a scanning line position of the current line and a scanning line position of the preceding line from the information indicating the scanning line positions of the second preceding line and preceding line that is stored in the table; and predict a distance between the scanning line position of the current line and a scanning line position of a line succeeding the current line from the information which is stored in the table and indicates the scanning line positions of the preceding line and current line.

10. The apparatus according to claim 7, wherein said control unit is further configured to calculate a correction rate of the exposure amount based on the calculated distance and the dot pattern; control the exposure amount of the dot of interest using the correction rate; and calculate the correction rate so that a density at a position of the dot of interest that is predicted using the calculated distance and the dot pattern when the error does not exist matches a density at the position of the dot of interest that is predicted using the calculated distance and the dot pattern when the error exists.

11. The apparatus according to claim 7, wherein said distance calculation unit is further configured to acquire a variation of the scanning line position on the image carrier in a main scanning direction, for the current line, and calculate the distance which reflects the variation in the main scanning direction.

12. An image processing apparatus comprising:
an error calculation unit configured to calculate an error of a scanning line position on an image carrier in a sub-scanning direction, for a current line;
an update unit configured to sequentially update, by using the calculated error, information indicating errors of the scanning line positions stored in a table, wherein the table stores information indicating the errors of scanning line positions on the image carrier for the current line and for a plurality of lines preceding the current line;
a distance calculation unit configured to calculate a distance between the scanning line position of the current line and scanning line positions of lines near the current line on the image carrier by looking up the table;
a control unit configured to calculate a correction rate on an exposure amount from the calculated distance and controlling an exposure amount for the current line using the correction rate; and
a coefficient setting unit configured to set, by looking up the table, a coefficient which is used when said distance calculation unit calculates the distance.

13. The apparatus according to claim 12, wherein said distance calculation unit is further configured to calculate a distance between the scanning line position of the current line and a scanning line position of a line preceding the current line, and a distance between the scanning line position of the current line and a scanning line position of a line succeeding the current line.

14. The apparatus according to claim 12, further comprising a function setting unit configured to measure a density of a patch formed on the image carrier, and set, based on a measurement result of the density and a density of the patch that is predicted by said control unit, a density prediction function which is used when said control unit calculates the correction rate.

15. An image processing method for an image processing apparatus which controls an exposure amount in forming an electrostatic latent image on an image carrier by scanning and exposing the image carrier in a main scanning direction using an exposure unit, which image carrier moves in a sub-scanning direction perpendicular to the main-scanning direction, comprising the steps of:
obtaining position information indicating a scanning position in the sub-scanning direction on the image carrier;
calculating a first scanning line interval and a second scanning line interval, by using position information about a scanning line of interest to be scanned and position information about a scanned scanning line which has already been scanned, wherein the first scanning line interval indicates a distance in the sub-scanning direction between the scanning line of interest and a succeeding scanning line to be scanned after the scanning line of interest, and wherein the second scanning line interval indicates a distance in the sub-scanning direction between the scanning line of interest and the scanned scanning line;
calculating a predicted density in the scanning line of interest using the first scanning line interval and the second scanning line interval;
calculating a correction rate on an exposure amount for the scanning line of interest so that the predicted density matches with a reference density calculated using a predetermined reference scanning line interval; and
correcting the exposure amount for the scanning line of interest by multiplying the exposure amount by the correction rate.

16. An image processing method for an image processing apparatus which controls an exposure amount in forming a plurality of scanning lines at an interval of a predetermined number of scanning lines by one scanning on an image carrier moving in a sub-scanning direction, which scanning is performed by an exposure unit which is configured to scan and expose in a main scanning direction perpendicular to the sub-scanning direction, comprising the steps of:
obtaining position information indicating a scanning position of each of the plurality of scanning lines in the sub-scanning direction on the image carrier;
calculating a first scanning line interval and a second scanning line interval, by using position information about a scanning line of interest to be scanned and position information about a scanned scanning line which has already been scanned, wherein the first scanning line interval and the second scanning line interval indicate distances in the sub-scanning direction between the scanning line of interest and scanning lines which sandwich the scanning line of interest;

calculating a predicted density in the scanning line of interest using the first scanning line interval and the second scanning line interval;

calculating a correction rate on an exposure amount for the scanning line of interest so that a predicted density matches with a reference density calculated using a predetermined reference scanning line interval; and correcting an exposure amount for the scanning line of interest by multiplying the exposure amount by the correction rate.

17. An image processing method comprising the steps of:
calculating an error of a scanning line position on an image carrier in a sub-scanning direction, for a current line;
updating, by using the calculated error, information indicating scanning line positions of a current line and a line preceding the current line;
calculating a distance between a dot of interest on the current line and a dot near the dot of interest by using the updated information indicating scanning line positions;
acquiring a dot pattern around the dot of interest; and
controlling an exposure amount of the dot of interest based on the calculated distance and the dot pattern.

18. An image processing method comprising the steps of:
calculating an error of a scanning line position on an image carrier in a sub-scanning direction, for a current line;
sequentially updating, by using the calculated error, information indicating errors of the scanning line positions stored in a table, wherein the table stores information indicating errors of scanning line positions on the image carrier for the current line and for a plurality of lines preceding the current line;
calculating a distance between the scanning line position of the current line and scanning line positions of lines near the current line on the image carrier by looking up the table;
calculating a correction rate on an exposure amount from the calculated distance;
controlling an exposure amount for the current line using the correction rate; and
setting, by looking up the table, a coefficient which is used when calculating the distance.

19. A non-transitory, computer-readable storage medium storing a program for causing an image processing apparatus to function as each unit of the image processing apparatus defined in claim 1.

20. A non-transitory, computer-readable storage medium storing a program for causing an image processing apparatus to function as each unit of the image processing apparatus defined in claim 6.

21. A non-transitory, computer-readable storage medium storing a program for causing an image processing apparatus to function as each unit of the image processing apparatus defined in claim 7.

22. A non-transitory, computer-readable storage medium storing a program for causing an image processing apparatus to function as each unit of the image processing apparatus defined in claim 12.

* * * * *